(12) United States Patent
Shimizu et al.

(10) Patent No.: US 11,851,059 B2
(45) Date of Patent: Dec. 26, 2023

(54) VEHICLE-TO-VEHICLE DISTANCE CONTROL DEVICE

(71) Applicant: Mitsubishi Electric Corporation, Tokyo (JP)

(72) Inventors: Yuji Shimizu, Tokyo (JP); Kazuhiro Nishiwaki, Tokyo (JP); Masahiro Iezawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 372 days.

(21) Appl. No.: 17/422,814

(22) PCT Filed: Feb. 14, 2019

(86) PCT No.: PCT/JP2019/005196
§ 371 (c)(1),
(2) Date: Jul. 14, 2021

(87) PCT Pub. No.: WO2020/165983
PCT Pub. Date: Aug. 20, 2020

(65) Prior Publication Data
US 2022/0089155 A1 Mar. 24, 2022

(51) Int. Cl.
*B60W 30/16* (2020.01)
*B60W 40/10* (2012.01)

(52) U.S. Cl.
CPC ............ *B60W 30/16* (2013.01); *B60W 40/10* (2013.01); *B60W 2520/10* (2013.01);
(Continued)

(58) Field of Classification Search
CPC .. B60W 30/16; B60W 40/10; B60W 2520/10; B60W 2554/802; B60W 2554/804; B60W 2754/30
(Continued)

(56) References Cited

U.S. PATENT DOCUMENTS

| 2002/0055813 A1* | 5/2002 | Adachi | G05D 1/0223 180/170 |
| 2017/0072953 A1* | 3/2017 | Nemoto | B60W 30/16 |
| 2017/0072957 A1* | 3/2017 | Nemoto | B60W 30/143 |

FOREIGN PATENT DOCUMENTS

| JP | 2002-160547 | * | 6/2002 |
| JP | 3661495 | * | 6/2005 |
| JP | 3661495 B2 | | 6/2005 |

OTHER PUBLICATIONS

International Search Report for PCT/JP2019/005196 dated Apr. 3, 2019 (PCT/ISA/210).

* cited by examiner

*Primary Examiner* — Muhammad Shafi
(74) *Attorney, Agent, or Firm* — Sughrue Mion, PLLC; Richard C. Turner

(57) ABSTRACT

A vehicle-to-vehicle distance control device includes a delay distance calculation unit and a delay distance compensation unit. In a running scene in which the velocity of a leading vehicle changes, a delay distance generated owing to a delay in a vehicle velocity control unit is calculated, and, while a delay distance compensation vehicle velocity command to compensate for the delay distance is considered for a vehicle velocity command, an actual vehicle-to-vehicle distance is controlled to be matched with a target track from an initial value of the vehicle-to-vehicle distance until arrival at a target vehicle-to-vehicle distance obtained after the leading vehicle accelerates/decelerates.

12 Claims, 20 Drawing Sheets

(52) U.S. Cl.
CPC . *B60W 2554/802* (2020.02); *B60W 2554/804* (2020.02); *B60W 2754/30* (2020.02)

(58) Field of Classification Search
USPC .......................................................... 701/93
See application file for complete search history.

VEHICLE-TO-VEHICLE DISTANCE CONTROL DEVICE

CROSS REFERENCE TO RELATED APPLICATIONS

This application is a National Stage of International Application No. PCT/JP2019/005196 filed Feb. 14, 2019.

TECHNICAL FIELD

The present disclosure relates to a vehicle-to-vehicle distance control device.

BACKGROUND ART

Vehicle-to-vehicle distance control devices (adaptive cruise control) are devices that control constant-velocity running while keeping the vehicle-to-vehicle distance between a leading vehicle and an own vehicle constant. Recently, it has been required to not only control running while keeping the vehicle-to-vehicle distance to a leading vehicle but also control running so as to adapt to the feeling of the driver according to various running situations. For example, Patent Document 1 proposes a technique in which: a temporal change, in a vehicle-to-vehicle distance, that is made until the vehicle-to-vehicle distance converges to a target vehicle-to-vehicle distance value is defined by a filter; and feedback control and feedforward control are used to perform control for follow-up to a leading vehicle. Patent Document 1 further describes being able to realize a vehicle-to-vehicle distance control system simulating operating characteristics of a driver, by setting response characteristics (the frequency and the attenuation coefficient of the filter) of the vehicle-to-vehicle distance control system according to a target vehicle interval deviation (the deviation between a detected vehicle-to-vehicle distance value and a target vehicle-to-vehicle distance) and a detected relative velocity value.

CITATION LIST

Patent Document

Patent Document 1: Japanese Patent No. 3661495

SUMMARY OF THE INVENTION

Problems to be Solved by the Invention

A vehicle-to-vehicle distance control device needs to adapt also to scenes in which a leading vehicle velocity varies, such as a scene in which follow-up to a leading vehicle that decelerates to stop is performed. In the above-described follow-up scene, in association with the deceleration of the leading vehicle, a target vehicle-to-vehicle distance also decreases. Thus, the vehicle-to-vehicle distance control device needs to achieve follow-up to the leading vehicle by combining "acceleration to shorten the vehicle-to-vehicle distance" and "deceleration according to the deceleration of the leading vehicle velocity" with respect to the target vehicle-to-vehicle distance which has decreased.

In Patent Document 1, a vehicle velocity command is generated according to the sum of three terms, i.e., feedback control (first term) and feedforward control (second term) for the vehicle-to-vehicle distance, and the leading vehicle velocity (third term), and a vehicle velocity control unit controls an own vehicle velocity to be matched with the vehicle velocity command. Thus, if a leading vehicle decelerates, the term for the feedforward control which is the second term generates a command to cause acceleration for achieving follow-up to the target vehicle-to-vehicle distance which has decreased in association with the deceleration of the leading vehicle, and the term for the leading vehicle velocity which is the third term generates a command to cause deceleration with follow-up to the leading vehicle. However, for the term for the leading vehicle velocity which is the third term, a response delay in the vehicle velocity control unit at a subsequent stage is not considered, and thus the command based on the second term becomes dominant. As a result, if the leading vehicle decelerates, the vehicle-to-vehicle distance becomes shorter than the target vehicle-to-vehicle distance, and an approach to the leading vehicle is made. In particular, if the leading vehicle decelerates to stop, there is a concern that an approach beyond a stop distance which is a target vehicle-to-vehicle distance at the time of vehicle stoppage leads to collision with the leading vehicle.

The present, disclosure has been made to solve the above-described problems, and an object of the present disclosure is to provide a vehicle-to-vehicle distance control device that, in a running scene in which a leading vehicle decelerates, keeps a target vehicle-to-vehicle distance while causing deceleration with follow-up to a leading vehicle velocity.

Solution to the Problems

A vehicle-to-vehicle distance control device according to the present disclosure is a vehicle-to-vehicle distance control device that includes a vehicle velocity command calculation unit configured to calculate a vehicle velocity command for an own vehicle on the basis of a vehicle-to-vehicle distance between the own vehicle and a leading vehicle, a relative velocity to the leading vehicle, and a velocity of the own vehicle, the velocity of the own vehicle being controlled by a vehicle velocity control unit according to the vehicle velocity command calculated by the vehicle velocity command calculation unit so that the vehicle-to-vehicle distance is controlled. The vehicle-to-vehicle distance control device includes: a leading vehicle velocity calculation unit configured to calculate a velocity of the leading vehicle on the basis of the velocity of the own vehicle and the relative velocity to the leading vehicle; a target vehicle interval setting unit configured to set, on the basis of the velocity of the leading vehicle, a target vehicle-to-vehicle distance which is a target value according to which the vehicle-to-vehicle distance is controlled; a delay distance calculation unit configured to calculate, on the basis of the velocity of the leading vehicle calculated by the leading vehicle velocity calculation unit, a delay distance which is a variation amount, of the vehicle-to-vehicle distance, that is based on a response delay in the vehicle velocity control unit; a target track generation unit including a first filter configured to define a response characteristic from an initial value of the vehicle-to-vehicle distance until convergence to the target vehicle-to-vehicle distance, and a second filter configured to define a response characteristic until the delay distance is compensated for and caused to converge to zero, the target track generation unit being configured to generate a target track which is a vehicle-to-vehicle distance temporal record from the initial value of the vehicle-to-vehicle distance until arrival at the target vehicle-to-vehicle distance; an FB control unit configured to calculate a feedback vehicle velocity command by using a deviation between the vehicle-to-vehicle distance, and the target track; an FF control unit configured to calculate a feedforward vehicle velocity command corresponding to the target vehicle-to-vehicle distance by using a transfer function of the response characteristic defined by the first filter of the target track generation unit and a transfer function of a response characteristic of the vehicle velocity control unit; and a delay distance compensation unit configured to calculate a delay distance compensation vehicle velocity command corresponding to the delay distance by using a transfer function of the response characteristic defined by the second filter of the target track generation unit and the transfer function of the response characteristic of the vehicle velocity control unit. The vehicle velocity command calculation unit calculates the vehicle velocity command on the basis of the velocity of the leading vehicle, the feedback vehicle velocity command, the feedforward vehicle velocity command, and the delay distance compensation vehicle velocity command.

Effect of the Invention

In the vehicle-to-vehicle distance control device according to the present disclosure, in a running scene in which follow-up to the leading vehicle is performed, the target track defining the vehicle-to-vehicle distance temporal record from the initial value of the vehicle-to-vehicle distance from the leading vehicle until arrival at the target vehicle-to-vehicle distance obtained after the velocity of the leading vehicle is changed, is generated, and control is performed such that the generated target track and the actual vehicle-to-vehicle distance are matched with each other. Thus, it is possible to provide a vehicle-to-vehicle distance control device that, can keep a vehicle-to-vehicle distance even in a scene in which a leading vehicle decelerates.

BRIEF DESCRIPTION OF THE DRAWINGS

FIG. 13 is a control block diagram showing a configuration of a first FF control unit according to embodiment 4.

DESCRIPTION OF EMBODIMENTS

Figure 1:
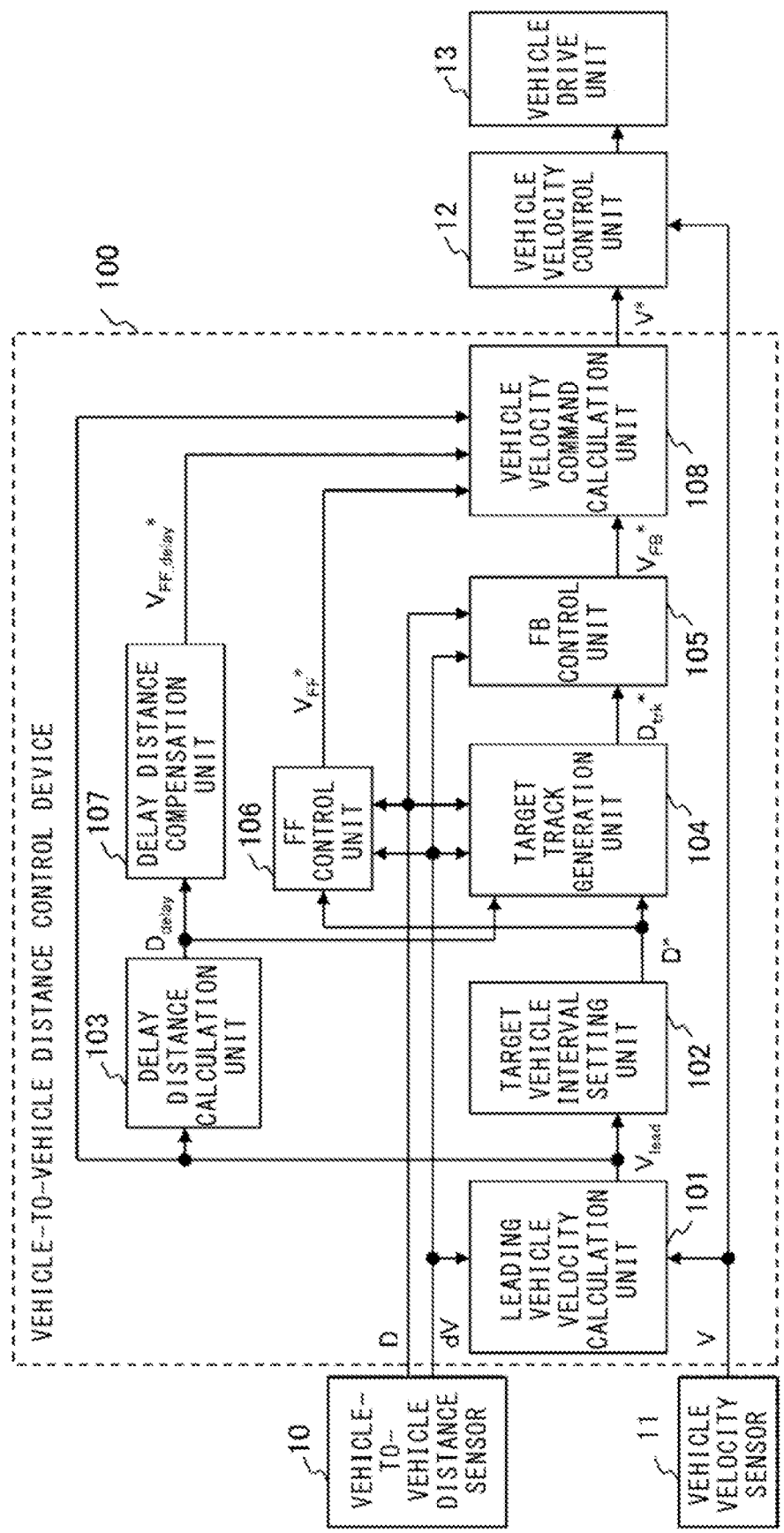
FIG. 1 is a function block diagram showing a configuration of a vehicle-to-vehicle distance control device according to embodiment 1.

Hereinafter, the present embodiments will be described with reference to the drawings. In the drawings, the same or corresponding parts are denoted by the same reference characters.

Embodiment 1

A vehicle-to-vehicle distance control device according to embodiment 1 will be described with reference to FIG. 1 to FIG. 10.

FIG. 1 is a function block diagram showing a configuration of the vehicle-to-vehicle distance control device according to the present embodiment 1. A vehicle-to-vehicle distance control device 100 generates, on the basis of a vehicle-to-vehicle distance D between an own vehicle and a leading vehicle and a relative velocity dV to the leading vehicle detected by a vehicle-to-vehicle distance sensor 10 and an own vehicle velocity (the velocity of the own vehicle, hereinafter, referred to as own vehicle velocity) V detected by a vehicle velocity sensor 11, a vehicle velocity command V* to cause running while keeping the vehicle-to-vehicle distance to the leading vehicle, and outputs the vehicle velocity command V* to a vehicle velocity control unit 12. The vehicle velocity control unit 12 outputs, to a vehicle drive unit 13, an acceleration degree command or a drive torque command such that the own vehicle velocity V is matched with the vehicle velocity command V*. The vehicle drive unit 13 controls an engine or drive motor, or a hydraulic brake, according to the acceleration degree command or the drive torque command, to apply braking force or driving force to the vehicle.

As shown in FIG. 1, the vehicle-to-vehicle distance control device 100 includes a leading vehicle velocity calculation unit 101, a target vehicle interval setting unit 102, a delay distance calculation unit 103, a target track generation unit 104, an FB control unit 105, an FF control unit 106, a delay distance compensation unit 107, and a vehicle velocity command calculation unit 108.

The vehicle-to-vehicle distance D between the own vehicle and the leading vehicle detected by the vehicle-to-vehicle distance sensor 10 is inputted to the target track generation unit 104, the FB control unit 105, and the FF control unit 106. The relative velocity dV to the leading vehicle is inputted to the leading vehicle velocity calculation unit 101, the target track generation unit 104, the FB control unit 105, and the FF control unit 106.

The own vehicle velocity V detected by the vehicle velocity sensor 11 is inputted to the leading vehicle velocity calculation unit 101 and the vehicle velocity control unit 12.

The leading vehicle velocity calculation unit 101 calculates a leading vehicle velocity (the velocity of the leading vehicle, hereinafter, referred to as leading vehicle velocity) $V_{lead}$ on the basis of the relative velocity dV to the leading vehicle detected by the vehicle-to-vehicle distance sensor 10 and the own vehicle velocity V detected by the vehicle velocity sensor 11, and outputs the leading vehicle velocity $V_{lead}$ to the target vehicle interval setting unit 102, the delay distance calculation unit 103, and the vehicle velocity command calculation unit 108.

The target vehicle interval setting unit 102 sets a target vehicle-to-vehicle distance D* which is a target value for vehicle-to-vehicle distance control on the basis of the leading vehicle velocity $V_{lead}$ inputted from the leading vehicle velocity calculation unit 101, and outputs the target vehicle-to-vehicle distance D* to the target track generation unit 104 and the FF control unit 106.

The delay distance calculation unit 103 calculates a delay distance $D_{delay}$ (described later) on the basis of the leading vehicle velocity $V_{lead}$ and outputs the delay distance $D_{lead}$ to the target track, generation unit 104 and the delay distance compensation unit 107.

The target track generation unit 104 generates, on the basis of the target vehicle-to-vehicle distance D* and the delay distance $D_{delay}$, target track $D_{trk}$* which is a temporal record until the vehicle-to-vehicle distance D converges, from a vehicle-to-vehicle distance initial value $D_0$ which is an initial value thereof, to the target vehicle-to-vehicle distance D*. The target track generation unit 104 outputs the target track $D_{trk}$* to the FB control unit 105.

The FB control unit 105 generates a feedback vehicle velocity command $V_{FB}$* on the basis of the vehicle-to-vehicle distance D, the relative velocity dV, and the target track $D_{trk}$* and outputs the feedback vehicle velocity command $V_{FB}$* to the vehicle velocity command calculation unit 108.

The FF control unit 106 generates a feedforward vehicle velocity command $V_{FF}$* on the basis of the vehicle-to-vehicle distance D, the relative velocity dV, and the target vehicle-to-vehicle distance D* and outputs the feedforward vehicle velocity command $V_{FF}$* to the vehicle velocity command calculation unit 108.

The delay distance compensation unit 107 (generates a delay distance compensation vehicle velocity command $V_{FF\_delay}$* on the basis of the delay distance $D_{delay}$ and outputs the delay distance compensation vehicle velocity command $V_{FF\_delay}$* to the vehicle velocity command calculation unit 108.

The vehicle velocity command calculation unit 108 calculates a vehicle velocity command V* on the basis of the leading vehicle velocity $V_{lead}$, the feedback vehicle velocity command $V_{FB}$*, the feedforward vehicle velocity command $V_{FF}$*, and the delay distance compensation vehicle velocity command $V_{FF\_delay}$*, and outputs the vehicle velocity command V* to the vehicle velocity control unit 12.

Next, an operation of each component of the vehicle-to-vehicle distance control device 100 will be described in detail.

In the leading vehicle velocity calculation unit 101, the leading vehicle velocity $V_{lead}$ can be obtained with the following expression (1) by using the relative velocity dV and the own vehicle velocity V.

[Mathematical 1]

$$V_{lead} = V + dV \quad (1)$$

In the target vehicle interval setting unit 102, the target vehicle-to-vehicle distance D* can be obtained with the following expression (2) by using the leading vehicle velocity $V_{lead}$.

[Mathematical 2]

$$D^* = \tau_{THW} \times V_{lead} + D_{stop} \quad (2)$$

In the above-described expression (2), $\tau_{THW}$ is a coefficient, and $D_{stop}$ is an offset, i.e., a target, vehicle-to-vehicle distance in the case where the leading vehicle is stopped. As the coefficient $\tau_{TWH}$ and the offset $D_{stop}$, a plurality of combinations of values are prepared in advance so that: a driver can select, a target vehicle-to-vehicle distance from among a plurality of vehicle interval settings, e.g., a plurality of levels such as Long (long distance). Middle (middle distance), and Short (short distance); and a corresponding one of the combinations can be set and inputted to the target vehicle interval setting unit 102 of the vehicle-to-vehicle distance control device 100.

The delay distance calculation unit 103 calculates a delay distance $D_{delay}$ by using the leading vehicle velocity $V_{lead}$. In the vehicle-to-vehicle distance control device 100, if, for example, setting of vehicle velocity command V*=leading vehicle velocity $V_{lead}$ is made, follow-up of the own vehicle velocity experiences a delay according to a response characteristic of the vehicle velocity control unit 12. Accordingly, the vehicle-to-vehicle distance varies. In the delay distance calculation unit 103, the delay distance $D_{delay}$ which is a distance variation amount based on the response characteristic of the vehicle velocity control unit 12 is obtained with the following expression (3).

[Mathematical 3]

$$D_{delay} = \frac{1}{s}(1 - G_V(s))V_{lead} \quad (3)$$

In the above-described expression (3), s represents a Laplace operator (the same applies below), 1/s represents an integrating element, and the transfer function $G_V(s)$ represents the response characteristic of the vehicle velocity control unit 12. In expression (3), a vehicle velocity difference generated according to the response characteristic $G_V(s)$ of the vehicle velocity control unit 12 is integrated so that a delay distance $D_{delay}$ is obtained.

The response characteristic $G_V(s)$ of the vehicle velocity control unit 12 in the above-described expression (3) is defined as in, for example, the following expression (4). Expression (4) is a first-order transfer function of a

[Mathematical 4]

$$G_V(s) = \frac{1}{\tau_V s + 1} \quad (4)$$

Figure 2:
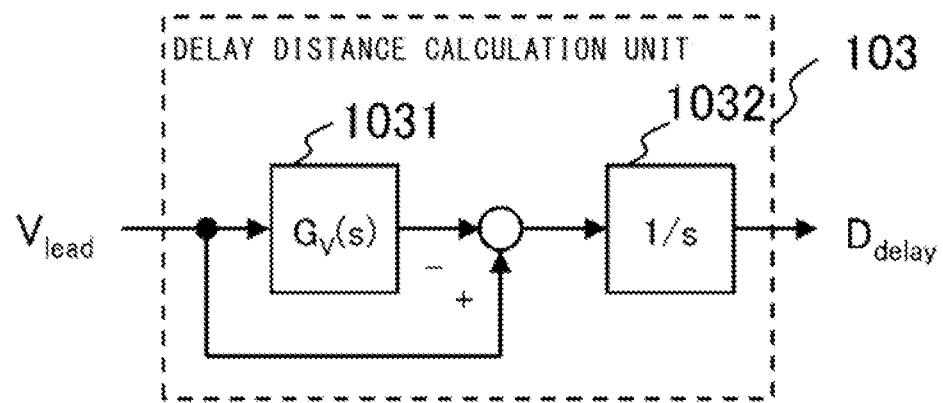
FIG. 2 is a control block diagram showing a configuration of a delay distance calculation unit according to embodiment 1.

FIG. 2 is a control block diagram showing a configuration of the delay distance calculation unit 103. As shown in FIG. 2, the delay distance calculation unit 103 is expressed by using the transfer function $G_V(s)$ 1031 of the vehicle velocity control unit 12 and an integrator 1/s 1032 indicated in mathematical expression (4). The leading vehicle velocity $V_{lead}$ is inputted to the transfer function $G_V(s)$ 1031, and an output from the integrator 1/s 1032 having received $V_{lead} - V_{lead} \times G_V(s)$ which is the difference between a result from the transfer function $G_V(s)$ 1031 and the leading vehicle velocity $V_{lead}$, is the delay distance $D_{delay}$ in the above-described expression (3).

The target track generation unit 104 generates a target track $D_{trk}^*$ by means of filters. If the leading vehicle velocity is assumed to be constant, the target track $D_{trk}^*$ can be obtained with the following expression (5) by using the target vehicle-to-vehicle distance D* and a filter $F_d(s)$.

[Mathematical 5]

$$D_{trk}^* = F_d(s)D^* \quad (5)$$

In the above-described expression (5), input, to the filter $F_d(s)$ is set to be step input from the initial value $D_0$ of the vehicle-to-vehicle distance D to the target vehicle-to-vehicle distance D*. This makes it possible to generate a temporal record from the vehicle-to-vehicle distance initial value $D_0$ until convergence to the target vehicle-to-vehicle distance D*. The filter $F_d(s)$ defines a response characteristic as, for example, a second-order transfer function of a frequency $\omega_d$ and an attenuation coefficient $\zeta_d$ corresponding to the target vehicle-to-vehicle distance D*, shown in the following expression (6).

[Mathematical 6]

$$F_d(s) = \frac{\omega_d^2}{s^2 + 2\zeta_d \omega_d s + \omega_d^2} \quad (6)$$

If the leading vehicle velocity varies, the delay distance $D_{delay}$ based on the response characteristic of the vehicle velocity control unit 12 needs to be considered and compensated for. A process performed by the target track generation unit 104 in consideration of the variation in the leading vehicle velocity is indicated in the following mathematical expression (7).

[Mathematical 7]

$$D_{trk}^* = F_d(s)D^* + D_{delay} - D_{delay}(s)D_{delay} \quad (7)$$

The second term of the above-described expression (7) is a distance variation amount represented by the delay distance $D_{delay}$, and the third term thereof is a term for correcting the delay distance $D_{delay}$ according to a response characteristic of a filter $F_{delay}(s)$. In the same manner as the filter $F_d(s)$, the filter $F_{delay}(s)$ defines a response characteristic as, for example, a second-order transfer function of a frequency $\omega_{delay}$ and an attenuation coefficient $\zeta_{delay}$ corresponding to the delay distance $D_{delay}$, in the following mathematical expression (8).

[Mathematical 8]

$$F_{delay}(s) = \frac{\omega_{delay}^2}{s^2 + 2\zeta_{delay}\omega_{delay}s + \omega_{delay}^2} \quad (8)$$

Figure 3:
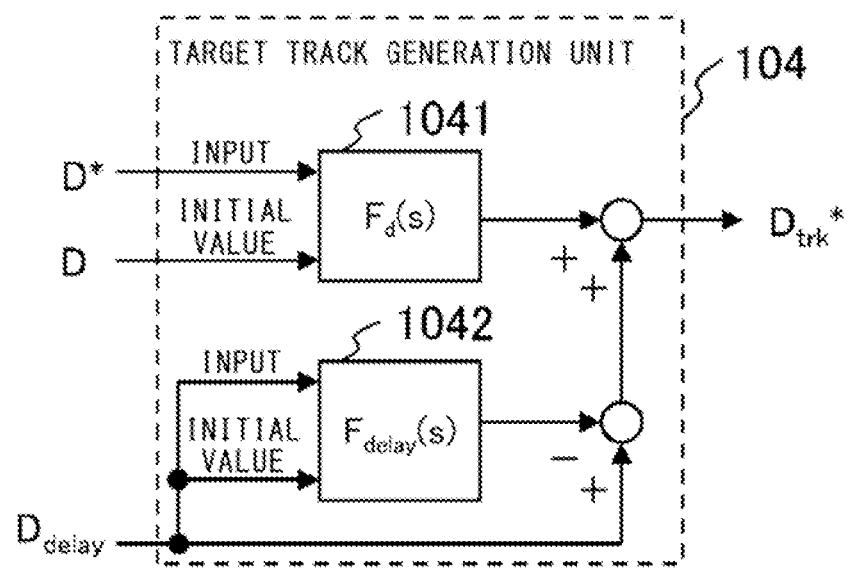
FIG. 3 is a control block diagram showing a configuration of a target track generation unit according to embodiment 1.

FIG. 3 is a control block diagram showing a configuration of the target track generation unit 104. As shown in FIG. 3, the target track generation unit 104 is expressed by using the filter $F_d(s)$ 1041 which is a first filter and the filter $F_{delay}(s)$) 1042 which is a second filter indicated in mathematical expression (7). At this time, for the filter $F_d(s)$ 1041, the input is set to the target vehicle-to-vehicle distance D* and the initial value is set to the initial value $D_0$ of the vehicle-to-vehicle distance D. Further, for the filter $F_{delay}(s)$ 1042, both the input and the initial value are set to the delay distance $D_{delay}$.

That is, a process is executed by the filter $F_d(s)$ 1041 such that the initial value $D_0$ of the vehicle-to-vehicle distance D converges to the target vehicle-to-vehicle distance D* according to the response characteristic that has been defined and set in the transfer function of expression (6). In addition, a process is executed by the filter $F_{delay}(s)$ 1042 such that the delay distance $D_{delay}$ becomes zero according to the response characteristic that has been defined and set in the transfer function of expression (8). The processes are executed by these two filters, whereby a target track $D_{trk}^*$ is generated.

The FB control unit 105 receives the target track $D_{trk}^*$ outputted from the target track generation unit 104 and performs PD (proportional-derivative) control on the deviation between the vehicle-to-vehicle distance D and the target track $D_{trk}^*$ as shown in the following expression (9). Consequently, the FB control unit 105 generates a feedback vehicle velocity command $V_{FB}^*$ and outputs the feedback vehicle velocity command $V_{FB}^*$ to the vehicle velocity command calculation unit 108.

[Mathematical 9]

$$V_{FB}^* = -(K_{dp} + sK_{dd})(D_{trk}^* - D) \quad (9)$$

In the above-described expression (9), $K_{dp}$ is a proportional gain, and $K_{dd}$ is a derivative gain. The deviation between the vehicle-to-vehicle distance D and the target track $D_{trk}^*$ is multiplied by the sum of both gains, whereby a feedback vehicle velocity command $V_{FB}^*$ is generated.

As expressed in the following expression (10), the FF control unit 106 receives the target vehicle-to-vehicle distance D* and generates a feedforward vehicle velocity command $V_{FF}^*$ by using a transfer function $C_{FF}(s)$.

[Mathematical 10]

$$V_{FF}^* = C_{FF}(s) D^* \quad (10)$$

The transfer function $C_{FF}(s)$ in the above-described expression (10) is expressed as in the following expression (11) by using the filter $F_d(s)$ of the target, track generation unit 104 and the transfer function $P(s)$ to be subjected to control by the vehicle-to-vehicle distance control device 100.

[Mathematical 11]

$$C_{FF}(s) = \frac{F_d(s)}{P(s)} \quad (11)$$

The transfer function $P(s)$ in the above-described expression (11) is expressed as in the following expression (12) by using the transfer function $G_V(s)$ of the vehicle velocity control unit 12 and a negative integrator $(-1/s)$ for calculating a vehicle-to-vehicle distance from the own vehicle velocity.

[Mathematical 12]

$$P(s) = -\frac{G_V(s)}{s} \quad (12)$$

With the above-described expression (11) and expression (12), the transfer function $C_{FF}(s)$ of the FF control unit 106 is expressed as in the following expression (13).

[Mathematical 13]

$$C_{FF}(s) = -\frac{s F_d(s)}{G_V(s)} \quad (13)$$

Figure 4:
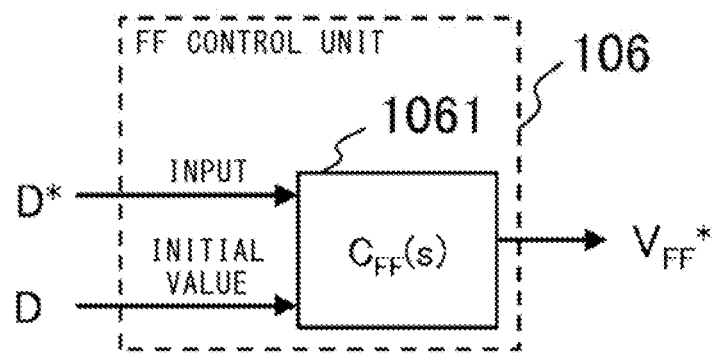
FIG. 4 is a control block diagram showing a configuration of an FF control unit according to embodiment 1.

FIG. 4 is a control block diagram showing a configuration of the FF control unit 106. As shown in FIG. 4, the FF control unit 106 is expressed by using the transfer function $C_{FF}(s)$ 1061 indicated in mathematical expression (10). At this time, for the transfer function $C_{FF}(s)$ 1061, the input is the target vehicle-to-vehicle distance D* and the initial value is the initial value $D_0$ of the vehicle-to-vehicle distance D.

As expressed in the following mathematical expression (14), the delay distance compensation unit 107 calculates a delay distance compensation vehicle velocity command $V_{FF\_delay}^*$ using a transfer function $C_{FF\_delay}(s)$. It is noted that this term has a function of canceling, by the response characteristic of the filter $F_{delay}(s)$ in expression (7), the delay distance $D_{delay}$ which is the distance variation amount based on the response characteristic of the vehicle velocity control unit 12. Thus, the input to this term is the negative value of the delay distance $D_{delay}$.

[Mathematical 14]

$$V_{FF\_delay}^* = C_{FF\_delay}(s)(-D_{delay}) \quad (14)$$

The transfer function $C_{FF\_delay}(s)$ in the above-described expression (14) is expressed as in the following expression (15) by using the filter $F_{delay}(s)$ of the target track generation unit 104 and the transfer function $P(s)$ to be subjected to control by the vehicle-to-vehicle distance control device 100.

[Mathematical 15]

$$C_{FF\_delay}(s) = \frac{F_{delay}(s)}{P(s)} \quad (15)$$

With the above-described expression (12) and expression (15), the transfer function $C_{FF\_delay}(s)$ is expressed as in the following expression (16).

[Mathematical 16]

$$C_{FF\_delay}(s) = -\frac{s F_{delay}(s)}{G_V(s)} \quad (16)$$

Figure 5:
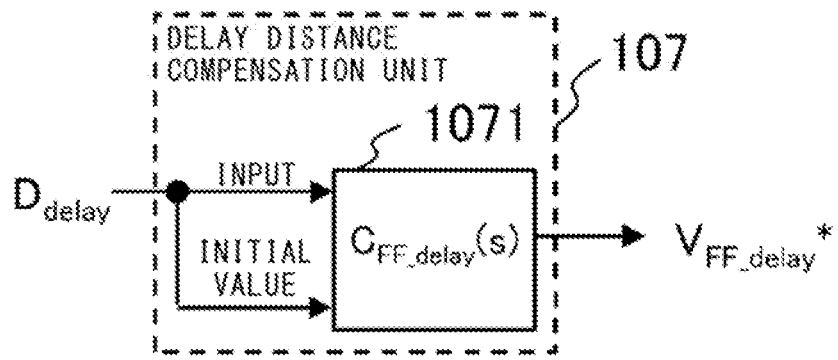
FIG. 5 is a control block diagram showing a configuration of a delay distance compensation unit according to embodiment 1.
Figure 6:
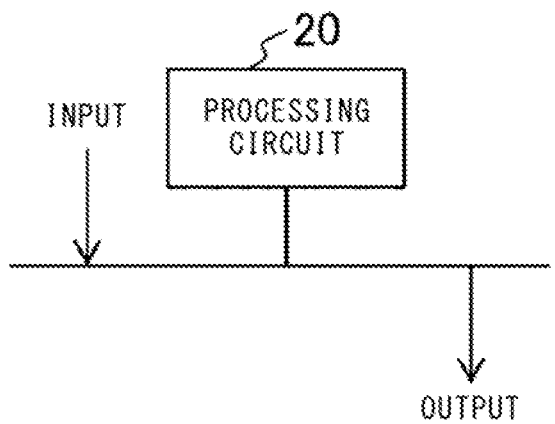
FIG. 6 is a block diagram showing a hardware configuration of the vehicle-to-vehicle distance control device according to embodiment 1.

FIG. 5 is a control block diagram showing a configuration of the delay distance compensation unit 107. As shown in FIG. 5, the delay distance compensation unit 107 is expressed by using the transfer function $C_{FF\_delay}(s)$ 1071 indicated in mathematical expression (14). At this time, for the transfer function $C_{FF\_delay}(s)$ 1071, both the input and the initial value are set to the delay distance $D_{delay}$.

As expressed in the following expression (17), the vehicle velocity command calculation unit 108 calculates a vehicle velocity command V* by summing the leading vehicle velocity $V_{lead}$, the feedback vehicle velocity command $V_{FB}^*$, the feedforward vehicle velocity command $V_{FF}^*$, and the delay distance compensation vehicle velocity command $V_{FF\_delay}^*$, and outputs the vehicle velocity command V* to the vehicle velocity control unit 12.

[Mathematical 17]

$$V^* = V_{FB}^* + V_{FF}^* + V_{FF\_delay}^* + V_{lead} \quad (17)$$

Each component cf the vehicle-to-vehicle distance control device 100 described above can be implemented with a computer, and the function of the component can be implemented through execution of a program by the computer. Specifically, the leading vehicle velocity calculation unit 101, the target vehicle interval setting unit 102, the delay distance calculation unit 103, the target track generation unit 104, the FB control unit 105, the FF control unit 106, the delay distance compensation unit 107, and the vehicle velocity command calculation unit 108 of the vehicle-to-vehicle distance control device 100 shown in FIG. 1 are each implemented by, for example, a processing circuit 20 shown in FIG. 6. As the processing circuit 20, a processor such as a central processing unit (CPU) or a digital signal processor (DSP) is used. The processing circuit 20 executes a program stored in a storage device, to implement the function of a corresponding one of the above-described components.

It is noted that dedicated hardware may be used as the processing circuit 20. In the case where the processing circuit 20 is dedicated hardware, the processing circuit 20 is, for example, a single circuit, a composite circuit, a programmed processor, a parallel programmed processor, an application specific integrated circuit (ASCI), a field programmable gate array (FPGA), or a combination thereof.

Figure 7:
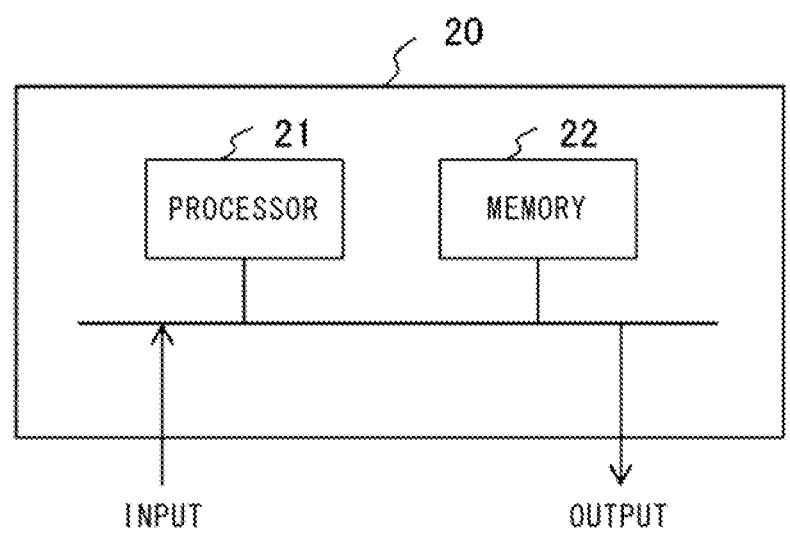
FIG. 7 is a block diagram snowing a hardware configuration of the vehicle-to-vehicle distance control device according to embodiment 1.

FIG. 7 shows a hardware configuration in the case where each of the leading vehicle velocity calculation unit 101, the target vehicle interval setting unit 102, the delay distance calculation unit 103, the target track generation unit 104, the FB control unit 105, the FF control unit 106, the delay distance compensation unit 107, and the vehicle velocity command calculation unit 108 which are the components of the vehicle-to-vehicle distance control device 100 shown in FIG. 1 is implemented with a processor. In this case, the function of each component of the vehicle-to-vehicle distance control device 100 is implemented by combination with software or the like (software, firmware, or software and firmware). The software or the like is written as a program and stored in a memory 22. A processor 21 functioning as the processing circuit 20 reads out and executes a program stored in the memory 22 (storage device), to implement the function of the corresponding component. Although not shown, the memory 22 includes a volatile storage device such as a random access memory (RAM) and a nonvolatile auxiliary storage device such as a flash memory. Alternatively, the memory 22 may include, as the auxiliary storage device, a hard disk instead of a flash memory. The processor 21 executes a program inputted from the memory 22. In this case, the program is inputted from the auxiliary storage device via the volatile storage device (electrically erasable programmable read only memory (EE-PROM)) to the processor 21. In addition, the processor 21 may output data such as a calculation result to the volatile storage device of the memory 22 or save the data via the volatile storage device to the auxiliary storage device.

Next, control operations in a running scene by the vehicle-to-vehicle distance control device 100 according to the present embodiment 1 will be described on the basis of simulation results. FIG. 3 is a diagram showing an example of the running scene. The drawing shows an example in which a leading vehicle LV decelerates from a state where an own vehicle OV and the leading vehicle LV are steadily running. In an initial state, the steady running is performed while own vehicle velocity V-leading vehicle velocity $V_{lead}=V_0$ and initial value $D_0$ of vehicle-to-vehicle distance D=target vehicle-to-vehicle distance D* are satisfied. After the leading vehicle decelerates and leading vehicle velocity $V_{lead}=V_1<V_0$ is satisfied, the own vehicle velocity V is controlled to be equal to leading vehicle velocity $V_{lead}=V_1$ obtained by the deceleration, and the vehicle-to-vehicle distance D is controlled to be equal to a larger vehicle-to-vehicle distance D* that has become smaller than that in the initial state.

Figure 8:
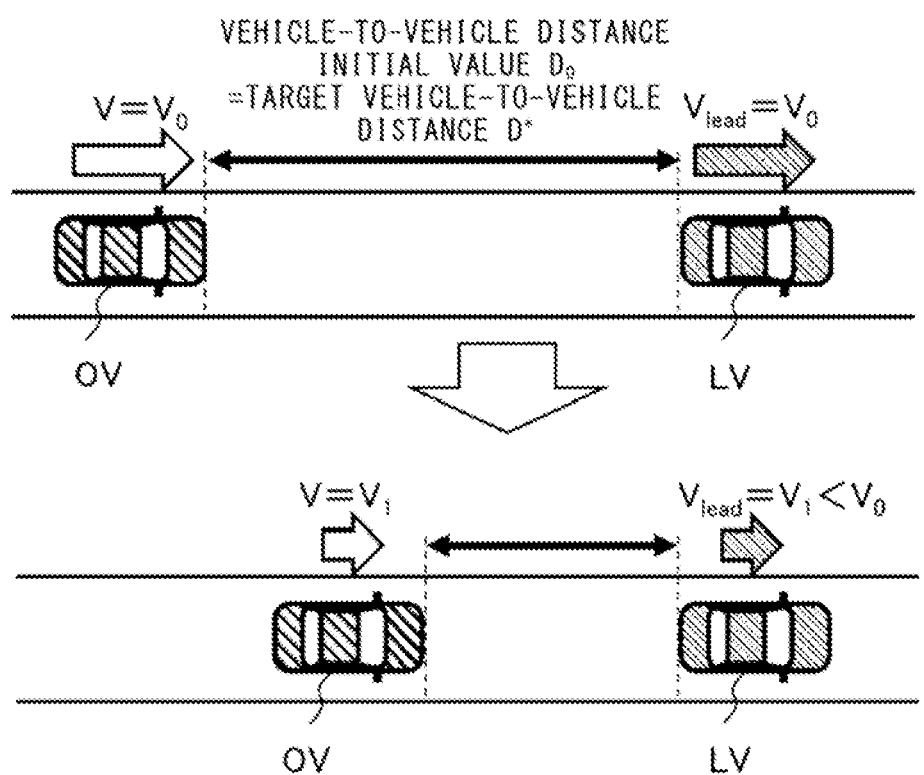
FIG. 8 is a diagram showing an example of a running scene in which control is to be performed by the vehicle-to-vehicle distance control device according to embodiment 1.
Figure 9:
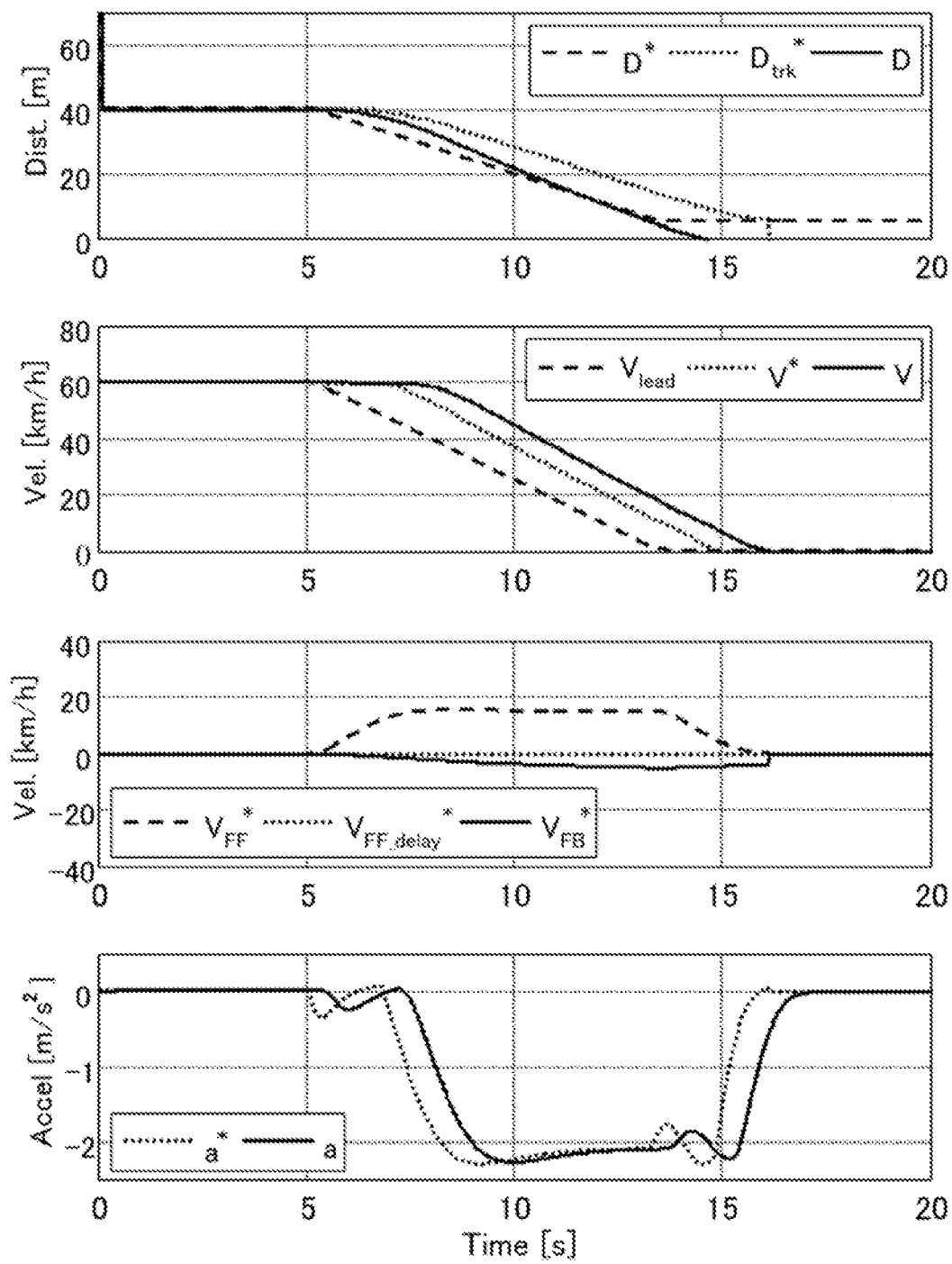
FIG. 9 is a diagram showing simulation results in a comparative example of embodiment 1.
Figure 10:
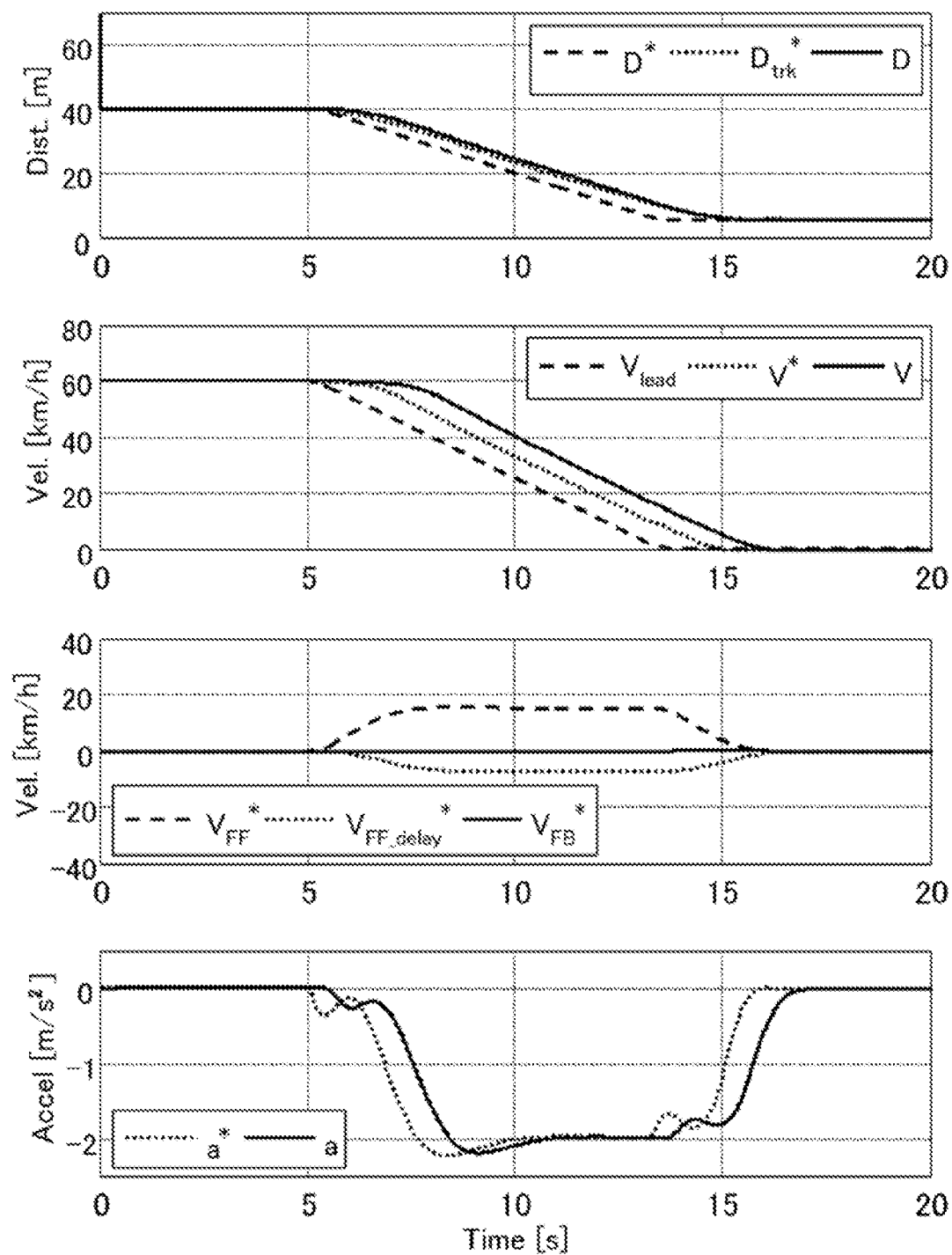
FIG. 10 is a diagram showing simulation results of control operations by the vehicle-to-vehicle distance control device according to embodiment 1.

FIG. 9 and FIG. 10 are diagrams showing simulation results in the running scene in FIG. 8. FIG. 9 shows results in a comparative example corresponding to a conventional technique. FIG. 10 shows results in the vehicle-to-vehicle distance control device 100 according to the present embodiment. In each of FIG. 9 and FIG. 10, simulation results of vehicle-to-vehicle distance (Dist.), velocity (Vel.), and acceleration degree (Accel.) are shown. In the drawing, the first row shows temporal changes in the vehicle-to-vehicle distance (Dist.) [m], the second row and the third row show temporal changes in the velocity (Vel.) [km/h], and the fourth row shows temporal changes in the acceleration degree (Accel.) [m/s²]. Regarding the acceleration degree, the above-described acceleration degree command outputted by the vehicle velocity control unit 12 to the vehicle drive unit 13 is denoted by "a*", and the acceleration degree of the own vehicle OV is denoted by "a".

First, the results corresponding to the conventional technique will be described.

FIG. 9 is a diagram showing simulation results in the case of using a vehicle-to-vehicle distance control device according to the conventional technique. The vehicle-to-vehicle distance control device according to the conventional technique has a configuration obtained by excluding, from the vehicle-to-vehicle distance control device 100 in FIG. 1, the delay distance calculation unit 103 and the delay distance compensation unit 107, and the delay distance $D_{delay}$ and the delay distance compensation vehicle velocity command $V_{FF\_delay}*$ which are outputs from the respective units. For comparison with operations in the present embodiment, the $V_{FF\_delay}*$ is displayed as zero in FIG. 9.

In the initial state, i.e., at a time 0 [s] in FIG. 9, vehicle-to-vehicle distance D=target vehicle-to-vehicle distance D*=40 [m] and own vehicle velocity V=leading vehicle velocity $V_{lead}=60$ [km/h] are satisfied. From this state, as shown in the second row, the leading vehicle LV starts to decelerate at a time 5 [s] and decelerates to a leading vehicle velocity $V_{lead}=0$ [km/h] at a time 13 [s]. Then, the target vehicle-to-vehicle distance D* decreases to $D*=D_{stop}=5$ [m] in association with the deceleration of the leading vehicle.

In the case of the conventional technique, as described in BACKGROUND ART, the sum of three terms, i.e., the feedback control and the feedforward control performed on the vehicle-to-vehicle distance and the leading vehicle velocity, is calculated so that a vehicle velocity command is generated, and the vehicle velocity control unit performs control such that the own vehicle velocity is matched with the vehicle velocity command. That is, the vehicle velocity command V* is calculated as in $V*=V_{FB}*+V_{FF}*\times V_{lead}$. The feedforward vehicle velocity command $V_{FF}*$ in the second term causes acceleration as shown in the third row for achieving follow-up to the decreasing target vehicle-to-vehicle distance D*. Meanwhile, the third term causes deceleration according to the leading vehicle velocity $V_{lead}$. With combination of these terms, the vehicle velocity command V* in the second row has a waveform in which deceleration occurs with a delay of about 2 [s] relative to the leading vehicle velocity $V_{lead}$, and the own vehicle velocity V is further delayed according to the transfer function $G_V(s)$ which is the response of the vehicle velocity control unit 12.

As a result, the vehicle-to-vehicle distance D subsequent to the deceleration of the leading vehicle LV becomes constantly shorter than the target track $D_{trk}*$, and a state of excessive approaching is obtained. Then, own vehicle velocity V=0 is satisfied and vehicle stoppage occurs at a time 16 [s] in the second row, but vehicle-to-vehicle distance D=0 is satisfied before a time 15 [s] in the first row. This leads to the finding that a vehicle-to-vehicle distance fails to be ensured at the time of vehicle stoppage at own vehicle velocity V=0. This failure is because no response delay in the vehicle velocity control unit 12 is considered in calculation of the vehicle velocity command V*.

Next, simulation results of control operations by the vehicle-to-vehicle distance control device 100 according to the present embodiment will be described with reference to FIG. 10. The states of the own vehicle OV and the leading vehicle LV in the initial state, i.e., at the time 0 [s], and change in $V_{lead}$ which is a deceleration waveform of the leading vehicle LV in the second row, are the same as those in FIG. 9. In the present embodiment, the delay distance $D_{delay}$ generated owing to a delay in the vehicle velocity control unit 12 is calculated. Then, as shown in the third row in FIG. 10, the delay distance compensation vehicle velocity command $V_{FF\_delay}*$ (the third term in expression (17)) causes deceleration to compensate for the delay distance $D_{delay}$. Thus, as shown in the second row, the vehicle velocity command V* has a waveform in which deceleration occurs with a delay, relative to the leading vehicle velocity $V_{lead}$, that is about half the delay in FIG. 9. As shown in the above-described expression (7), the target track $D_{trk}^*$ in the first row is obtained in consideration of the delay distance and $F_{delay}(s)D_{delay}$, which is a distance obtained by compensation by the delay distance compensation vehicle velocity command $V_{FF\_delay}^*$.

As a result, when the leading vehicle decelerates, the vehicle-to-vehicle distance D in the first row in FIG. 10 is constantly equal to the target track $D_{trk}^*$, and, also at the time of vehicle stoppage at own vehicle velocity V=0, vehicle-to-vehicle distance D=target vehicle-to-vehicle distance D* is satisfied. That is, the vehicle-to-vehicle distance D can be controlled in accordance with the target track $D_{trx}^*$ from deceleration to vehicle stoppage.

As described above, according to the present embodiment, the vehicle-to-vehicle distance control device includes the delay distance calculation unit 103 and the delay distance compensation unit 107, and, in a running scene in which the leading vehicle LV decelerates, the delay distance $D_{delay}$ generated owing to a delay in the vehicle velocity control unit 12 is calculated, and the delay distance compensation vehicle velocity command $V_{FF\_delay}^*$ causes deceleration to compensate for the delay distance $D_{delay}$. Thus, control can be performed such that the actual vehicle-to-vehicle distance is matched with the target track $D_{trk}^*$ from the initial value of the vehicle-to-vehicle distance until arrival at a target vehicle-to-vehicle distance obtained after the deceleration of the leading vehicle. That is, it is possible to provide a vehicle-to-vehicle distance control device capable of keeping a vehicle-to-vehicle distance even in a scene in which a leading vehicle decelerates.

An example in which the leading vehicle LV decelerates has been described in the above-described embodiment 1, but, also in the case of acceleration, control can be performed in the same manner. Thus, control can be performed such that the actual vehicle-to-vehicle distance is matched with the target track $D_{trk}^*$ from the initial value of the vehicle-to-vehicle distance until arrival at a target vehicle-to-vehicle distance obtained after acceleration of the leading vehicle.

Embodiment 2

A vehicle-to-vehicle distance control device according to embodiment 2 will be described with reference to FIG. 11 to FIG. 13.

Figure 11:
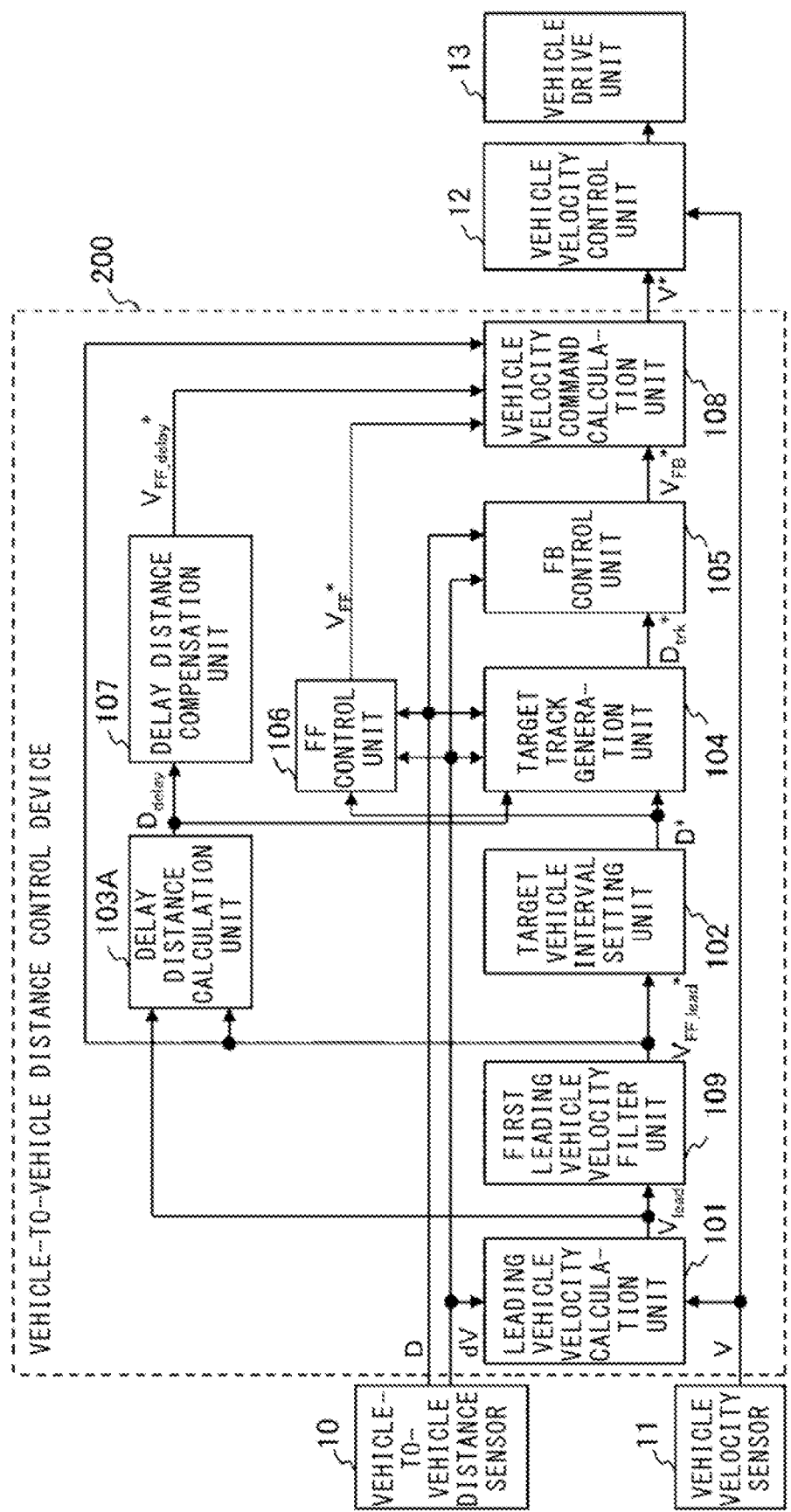
FIG. 11 is a function block diagram showing a configuration of a vehicle-to-vehicle distance control device according to embodiment 2.

FIG. 11 is a function block diagram showing a configuration of a vehicle-to-vehicle distance control device 200 according to the present embodiment 2. As shown in FIG. 11, as compared to the configuration of the vehicle-to-vehicle distance control device 100 according to embodiment 1 shown in FIG. 1, the vehicle-to-vehicle distance control device 200 has a configuration in which: a first leading vehicle velocity filter unit 109 is provided between the leading vehicle velocity calculation unit 101 and the target vehicle interval setting unit 102; and a delay distance calculation unit 103A is provided instead of the delay distance calculation unit 103.

In FIG. 11, the first leading vehicle velocity filter unit 109 receives the leading vehicle velocity $V_{lead}$ outputted from the leading vehicle velocity calculation unit 101, and calculates and outputs a leading vehicle velocity follow-up command $V_{FF\_lead}^*$. The outputted leading vehicle velocity follow-up command $V_{FF\_lead}^*$ is inputted to the target vehicle interval setting unit 102, the delay distance calculation unit 103A, and the vehicle velocity command calculation unit 108. In FIG. 11, the same components as those in the vehicle-to-vehicle distance control device 100 described with reference to FIG. 1 are denoted by the same reference characters, and the same description will not be repeated.

In the vehicle-to-vehicle distance control device 100 according to embodiment 1, as indicated in expression (17), the vehicle velocity command V* is calculated by using $V^*=V_{FB}^*+V_{FF}^*+V_{FF\_delay}^*+V_{lead}$, and $V_{lead}$ in the fourth term is intended to cause deceleration in the same manner as the leading vehicle LV. Thus, as is found in the fourth row in FIG. 10 in embodiment 1, at the timing of deceleration of the leading vehicle LV at the time 5 [s], the acceleration degree "a" of the own vehicle OV immediately responds and takes a negative value in association with the deceleration of the leading vehicle LV. It is not preferable to excessively respond to variation in the leading vehicle velocity in this manner.

Considering this, in the present embodiment 2, the first leading vehicle velocity filter unit 109 sets the input and the initial value for the filter $F_{lead}(s)$ to the leading vehicle velocity $V_{lead}$ on the basis of the following expression (18), to calculate a leading vehicle velocity follow-up command $V_{FF\_lead}^*$ for delaying the response of the vehicle velocity command V* relative to the leading vehicle velocity $V_{lead}$.

[Mathematical 18]

$$V_{FF\_lead}^* = F_{lead}(s)V_{lead} \tag{18}$$

The filter $F_{lead}(s)$ in the above-described expression (18) is defined by, for example, a first-order transfer function of a time constant $\tau_{lead}$ corresponding to the leading vehicle velocity $b_{lead}$, such as one in the following expression (19).

[Mathematical 19]

$$F_{lead}(s) = \frac{1}{\tau_{lead}s + 1} \tag{19}$$

Then, the target vehicle interval setting unit 102 and the vehicle velocity command calculation unit 108 receive, instead of the leading vehicle velocity $V_{lead}$ in embodiment 1, the leading vehicle velocity follow-up command $V_{FF\_lead}^*$ calculated by the first leading vehicle velocity filter unit 109. Further, in the delay distance calculation unit 103A, the following expression (20) is used instead of expression (3). Arrangement of expression (20) into expression (21) leads to the finding that a delay distance based on the response characteristic $G_V(s)$ of the vehicle velocity control unit 12 and the filter $F_{lead}(s)$ of the first, leading vehicle velocity filter unit 109 has been calculated.

[Mathematical 20]

$$D_{delay} = \frac{1}{s}(V_{lead} - G_V(s)V_{FFlead}^*) \tag{20}$$

[Mathematical 21]

$$D_{delay} = \frac{1}{s}(1 - G_V(s)F_{lead}(s))V_{lead} \tag{21}$$

Figure 12:
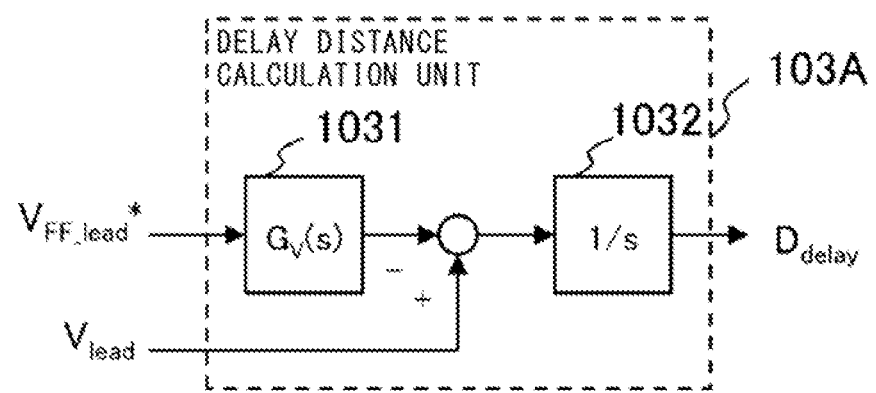
FIG. 12 is a control block diagram showing a configuration of a delay distance calculation unit according to embodiment 2.

FIG. 12 is a control block diagram showing a configuration of the delay distance calculation unit 103A. As shown in FIG. 12, the delay distance calculation unit 103A is expressed by using the transfer function $G_V(s)$ 1031 of the vehicle velocity control unit 12 and the integrator 1/s 1032 which are indicated in expression (20). Specifically, the leading vehicle velocity follow-up command $V_{FF\_lead}^*$ is inputted to the transfer function $G_V(s)$ 1031, and an output from the integrator 1/s 1032 having received $V_{lead} - G_V(s) \times V_{FF\_lead}^*$ which is the difference between a result from the transfer function $G_V(s)$ 1031 and the leading vehicle velocity $V_{lead}$, is the delay distance $D_{delay}$ in the above-described expression (20).

Next, control operations in a running scene by the vehicle-to-vehicle distance control device 200 according to the present embodiment 2 will be described on the basis of simulation results. The running scene is the same as that in FIG. 8 described in embodiment 1.

Figure 13:
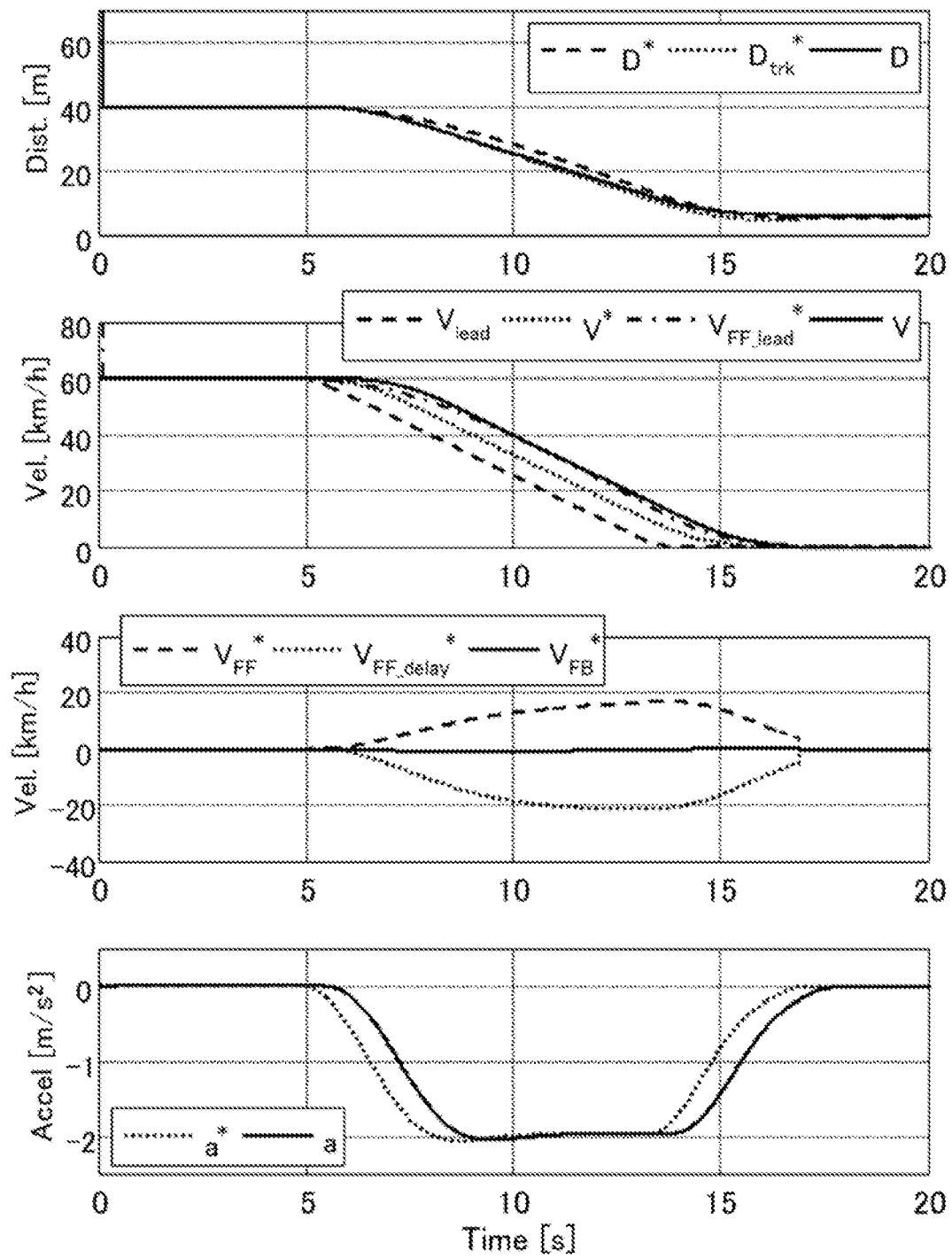
FIG. 13 is a diagram shewing simulation results of control operations by the vehicle-to-vehicle distance control device according to embodiment 2.

FIG. 13 shows the simulation results of the control operations by the vehicle-to-vehicle distance control device 200 according to the present embodiment 2. It is noted that display of the simulation results in FIG. 13 is the same as those in FIG. 9 and FIG. 10 in embodiment 1.

In $V^* = V_{FB}^* + V_{FF}^* + V_{FF\_delay}^* + V_{lead}$ which is expression (17) indicating the vehicle velocity command $V^*$ described in embodiment 1, each of the second and third terms is a term calculated through feedforward correspondingly to the leading vehicle velocity $V_{lead}$. In the present embodiment 2, all of the inputs to these terms are replaced by the leading vehicle velocity follow-up command $V_{FF\_lead}^*$ obtained by performing a filtering process on the leading vehicle velocity $V_{lead}$. Consequently, in FIG. 13, the target vehicle-to-vehicle distance $D^*$ in the first row, and the feedforward vehicle velocity command $V_{FF}^*$ and the delay distance compensation vehicle velocity command $V_{FF\_delay}^*$ in the third row, have smooth waveforms as compared to those in FIG. 10 in embodiment 1. As a result, the acceleration degree in the fourth row has a waveform in which deceleration gently starts and is gently completed.

In addition, a delay due to the first leading vehicle velocity filter unit 109 is also considered in the delay distance calculation unit 103A as indicated in the above-described expression (20). Thus, the vehicle-to-vehicle distance D can be controlled in accordance with the target track $D_{trk}^*$ from deceleration to vehicle stoppage. That is, the present configuration allows achievement of both "gentle deceleration" and "control of the vehicle-to-vehicle distance to follow the target track".

As described above, according to the present embodiment 2, the first leading vehicle velocity filter unit 109 is provided on a stage subsequent to the leading vehicle velocity calculation unit 101, and the vehicle velocity command $V^*$ is calculated by using the leading vehicle velocity follow-up command $V_{FF\_lead}^*$ obtained by performing a filtering process on the leading vehicle velocity $V_{lead}$. Thus, in addition to the advantageous effects of embodiment 1, the own vehicle OV can follow deceleration of the leading vehicle LV by gentle deceleration, whereby the driver can be provided with comfortable running.

An example in which the leading vehicle LV decelerates has been described in the above-described embodiment 2, but, also in the case of acceleration, control can be performed in the same manner. Thus, in addition to the advantageous effects of embodiment 1, the own vehicle OV can follow acceleration of the leading vehicle LV by gentle acceleration, whereby the driver can be provided with comfortable running.

Embodiment 3

A vehicle-to-vehicle distance control device according to embodiment 3 will be described with reference to FIG. 14 and FIG. 15.

Figure 14:
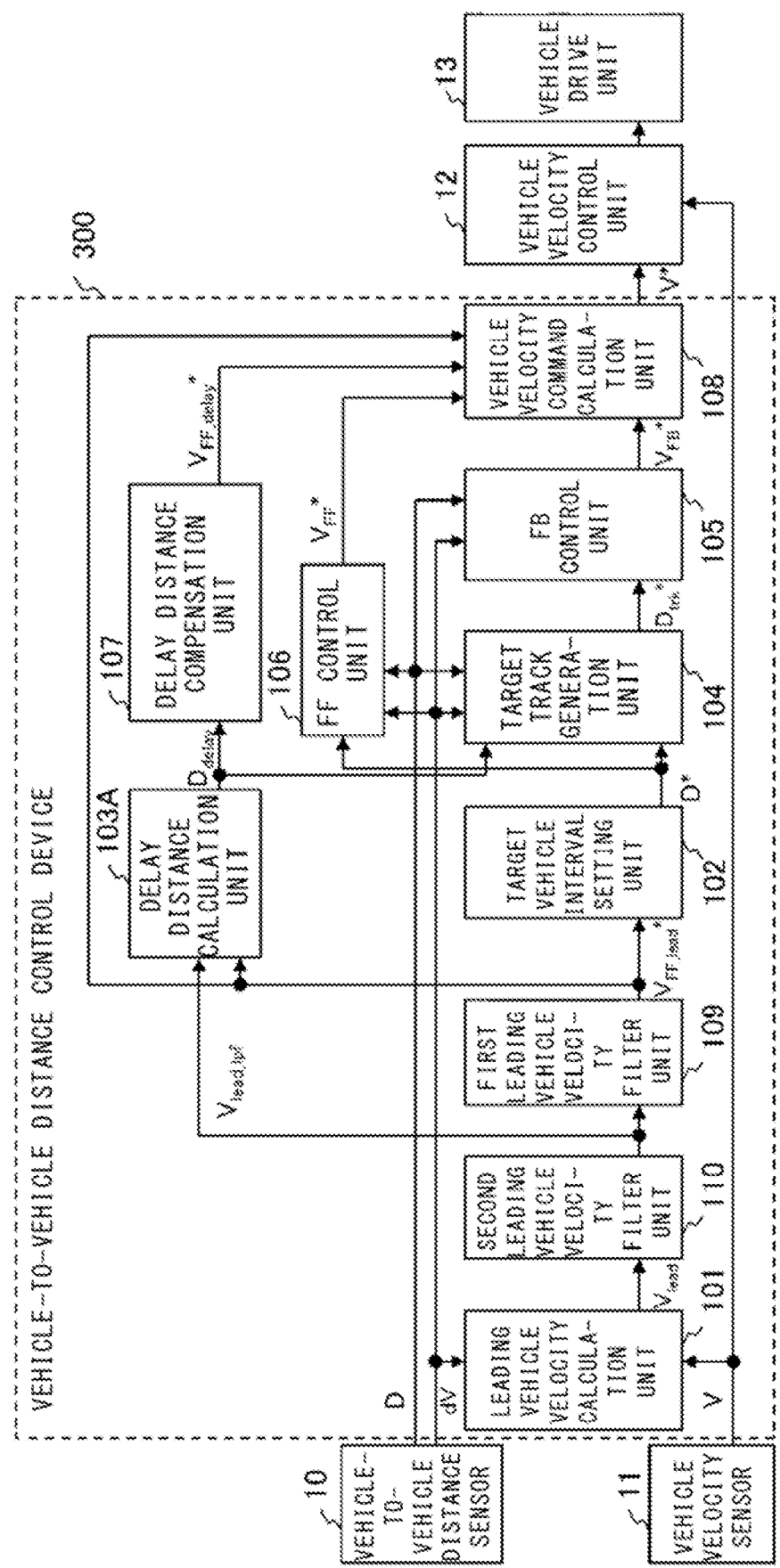
FIG. 14 is a function block diagram showing a configuration of a vehicle-to-vehicle distance control device according to embodiment 3.

FIG. 14 is a function block diagram showing a configuration of a vehicle-to-vehicle distance control device 300 according to the present embodiment 3. As shown in FIG. 14, as compared to the configuration of the vehicle-to-vehicle distance control device 200 according to embodiment 2 shown in FIG. 11, the vehicle-to-vehicle distance control device 300 has a configuration in which a second leading vehicle velocity filter unit 110 is further provided on a stage preceding the first leading vehicle velocity filter unit 109.

As shown in FIG. 14, filtering processes are performed on the leading vehicle velocity $V_{lead}$ by the second leading vehicle velocity filter unit 110 and the first leading vehicle velocity filter unit 109 in order. In addition, an output $V_{lead\_lpf}$ from the second leading vehicle velocity filter unit 110 and the output $V_{FF\_lead}^*$ from the first leading vehicle velocity filter unit 109 are inputted to the delay distance calculation unit 103A. In FIG. 14, the same components as those in the vehicle-to-vehicle distance control device 200 described with reference to FIG. 11 are denoted by the same reference characters, and the same description will not be repeated.

In the above-described vehicle-to-vehicle distance control device 200 according to the above-described embodiment 2, the leading vehicle velocity $V_{lead}$ is subjected to the filtering process by the first leading vehicle velocity filter unit 109, and meanwhile, if noises are included in the relative velocity dV from the vehicle-to-vehicle distance sensor 10 and the own vehicle velocity V from the vehicle velocity sensor 11, a value resulting from eliminating the noises from the leading vehicle velocity follow-up command $V_{FF\_lead}^*$ which is an output from the first leading vehicle velocity filter unit 109, is outputted. However, the delay due to filtering by the first leading vehicle velocity filter unit 109 is calculated and corrected by the delay distance calculation unit 103A, and thus influences of the noises are inflicted again on the delay distance $D_{delay}$ and the delay distance compensation vehicle velocity command $V_{FF\_delay}^*$ calculated on the basis of the delay distance $D_{delay}$. Therefore, the vehicle-to-vehicle distance control device 200 according to embodiment 2 cannot eliminate the noises in the relative velocity dV and the own vehicle velocity V.

Considering this, in the present embodiment 3, the second leading vehicle velocity filter unit 110 performs a filtering process on the leading vehicle velocity $V_{lead}$ on the basis of the following expression (22), to eliminate disturbance.

[Mathematical 22]

$$V_{lead\_lpf} = F_{lead2}(s) V_{lead} \quad (22)$$

A filter $F_{lead2}(s)$ in the above-described expression (22) is defined by, for example, a first-order transfer function of a time constant $\tau_{lead2}$, such as one in the following expression (23).

[Mathematical 23]

$$F_{lead2}(s) = \frac{1}{\tau_{lead2} s + 1} \quad (23)$$

As described above, the vehicle-to-vehicle distance control device 300 according to the present embodiment 3 includes, for the leading vehicle velocity $V_{lead}$, two filters, i.e., the first leading vehicle velocity filter unit 109 and the second leading vehicle velocity filter unit 110. The second leading vehicle velocity filter unit 110 has a function of eliminating noises in the relative velocity dV and the own vehicle velocity V, and a delay due to the second leading vehicle velocity filter unit 110 is compensated for by the FB control unit 105. Further, the first leading vehicle velocity filter unit 109 defines a response characteristic to variation in the leading vehicle velocity $V_{lead}$ in the vehicle-to-vehicle distance control device 300, and a delay due to the first leading vehicle velocity filter unit 109 is calculated by the delay distance calculation unit 103A and compensated for by the delay distance compensation unit 107.

Next, control operations in a running scene by the vehicle-to-vehicle distance control device 300 according to the present embodiment 3 will be described on the basis of simulation results. The running scene is the same as that in FIG. 8 described in embodiment 1

Figure 15:
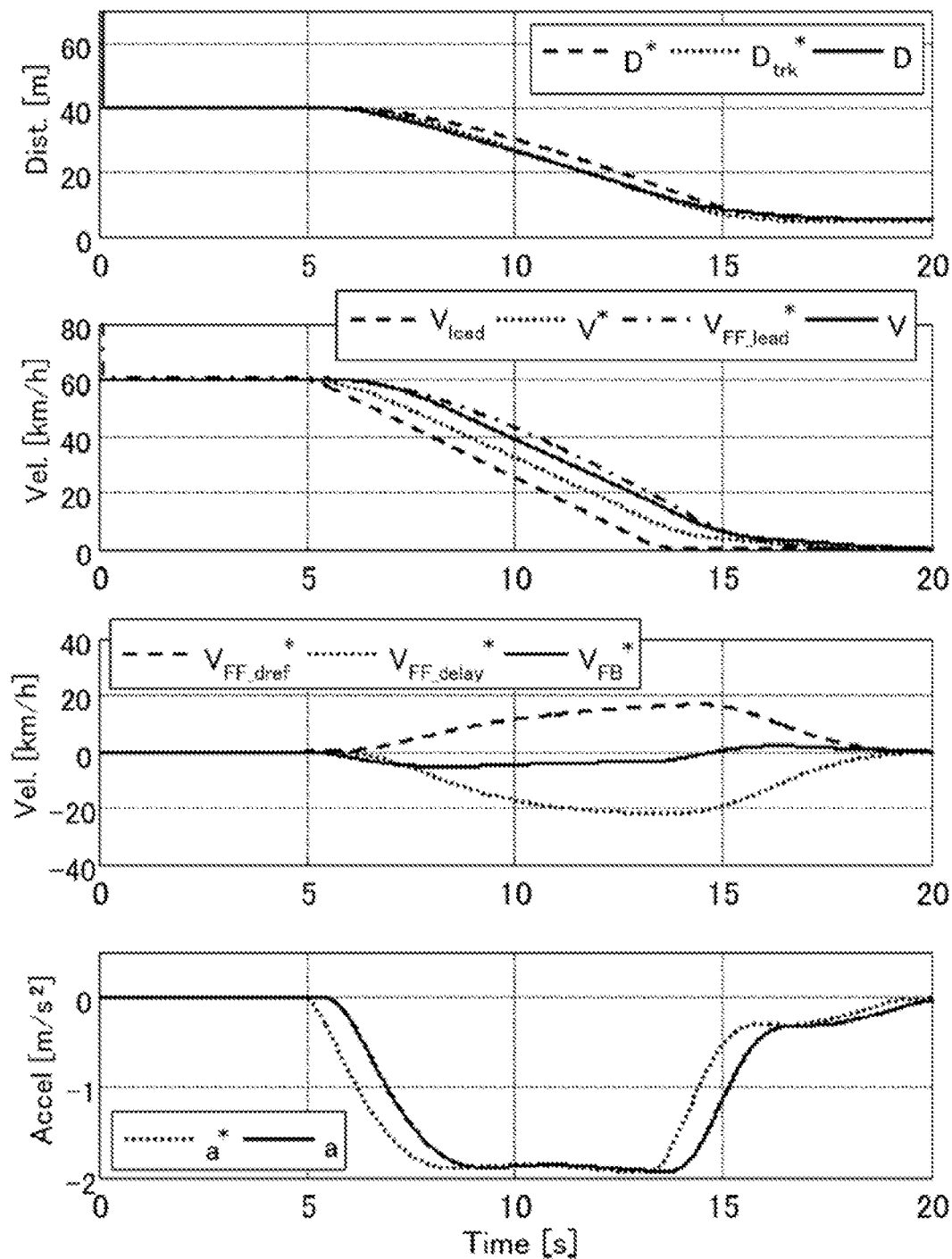
FIG. 15 is a diagram showing simulation results of control operations by the vehicle-to-vehicle distance control device according to embodiment 3.

FIG. 15 is a diagram showing simulation results of the control operations by the vehicle-to-vehicle distance control device 300 according to the present embodiment 3. It is noted that display of the simulation results in FIG. 15 is the same as those in FIG. 9 and FIG. 10 in embodiment 1.

In the present embodiment 3, the leading vehicle velocity filter unit 110 which is a second filter is added for the leading vehicle velocity $V_{lead}$, and thus the leading vehicle velocity follow-up command $V_{FF\_lead}*$ the second row in FIG. 15 has a waveform with a delay relative to the leading vehicle velocity follow-up command $V_{FF\_lead}*$ shown in FIG. 13 in embodiment 2. Considering this, as indicated by the feedback vehicle velocity command $V_{FB}*$ in the third row in FIG. 15, the FB control unit 105 causes deceleration to compensate for the delay, whereby the vehicle-to-vehicle distance D can be controlled to be matched with the target track $D_{trk}*$. That is, "suppression of influences of noises in the relative velocity dV and the own vehicle velocity V" is enabled in addition to "gentle deceleration" and "control of the vehicle-to-vehicle distance to follow the target track".

As described above, according to the present embodiment 3, the second leading vehicle velocity filter unit 110 is further provided between the leading vehicle velocity calculation unit 101 and the first, leading vehicle velocity filter unit 109, and noises due to the own vehicle velocity V and the relative velocity dV between the own vehicle OV and the leading vehicle LV are suppressed, and thus it is possible to provide a vehicle-to-vehicle distance control device that, can achieve, in addition to the advantageous effects of embodiments 1 and 2, more accurate control to cause the vehicle-to-vehicle distance D to be matched with the target track $D_{trk}*$.

An example in which the leading vehicle LV decelerates has been described in the above-described embodiment 3, but, also in the case of acceleration, noises due to the own vehicle velocity V and the relative velocity dV between the own vehicle OV and the leading vehicle LV can be suppressed in the same manner, and thus it is possible to provide a vehicle-to-vehicle distance control device that, can achieve, in addition to the advantageous effects of embodiments 1 and 2, more accurate control to cause the vehicle-to-vehicle distance D to be matched with the target track $D_{trk}*$.

Embodiment 4

A vehicle-to-vehicle distance control device according to embodiment 4 will be described with reference to FIG. 16 to FIG. 23.

Figure 16:
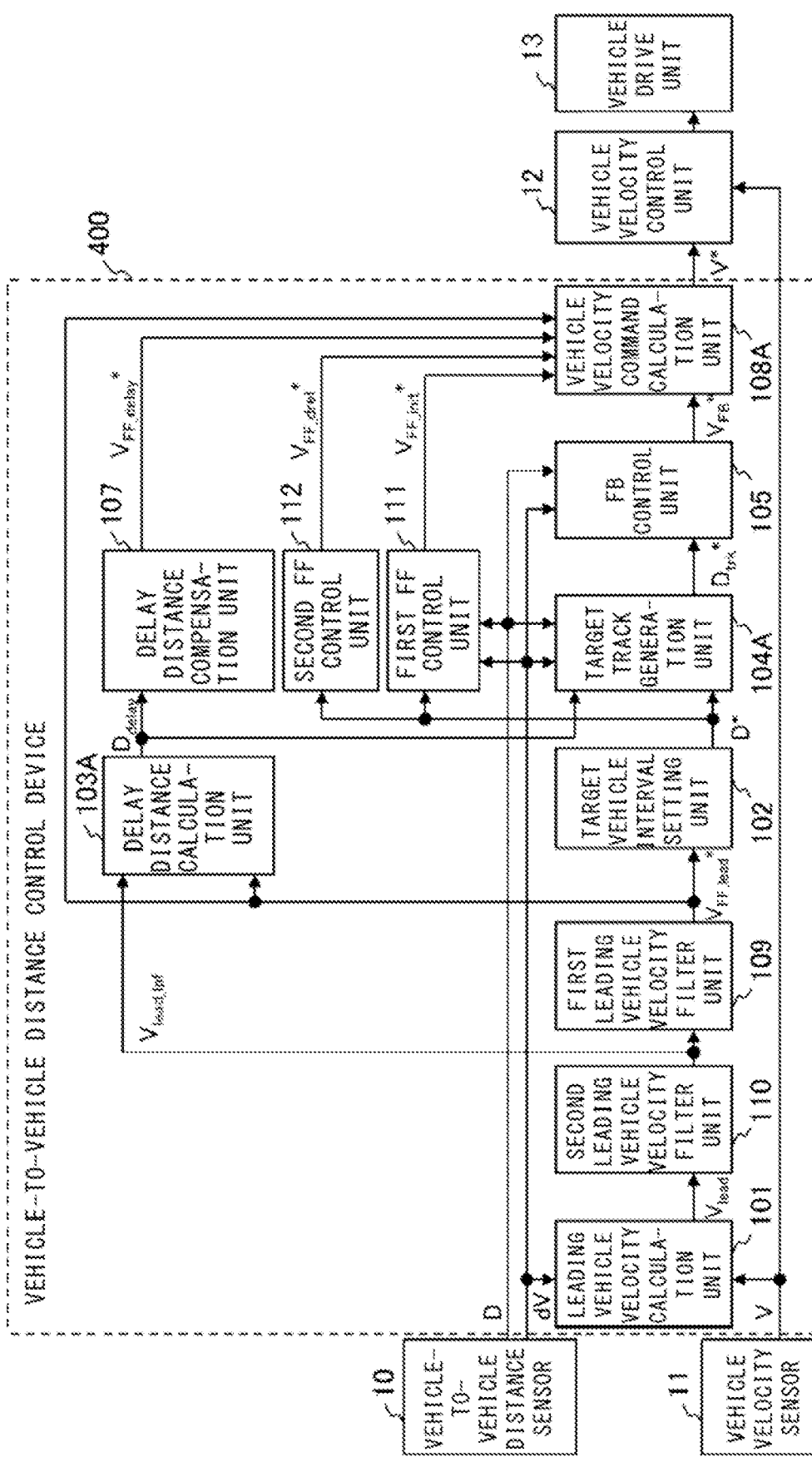
FIG. 16 is a function block diagram showing a configuration of a vehicle-to-vehicle distance control device according to embodiment 4.

FIG. 16 is a function block diagram showing a configuration of a vehicle-to-vehicle distance control device 400 according to the present embodiment 4. As shown in FIG. 16, as compared to the configuration of the vehicle-to-vehicle distance control device 300 according to embodiment 3 shown in FIG. 14, the vehicle-to-vehicle distance control device 400 has a configuration in which: a target, track generation unit 104A is provided instead of the target track generation unit 104; as the FF control unit, a first FF control unit 111 and a second FF control unit 112 are provided instead of the FF control unit 106; and further, a vehicle velocity command calculation unit 108A is provided instead of the vehicle velocity command calculation unit 108.

As shown in FIG. 16, the first FF control unit 111 receives the vehicle-to-vehicle distance D and the relative velocity dV outputted from the vehicle-to-vehicle distance sensor 10 and the target vehicle interval D* outputted from the target vehicle interval setting unit 102, and calculates and outputs a first feedforward vehicle velocity command $V_{FF\_init}*$. The outputted first feedforward vehicle velocity command $V_{FF\_init}*$ is inputted to the vehicle velocity command calculation unit 109A.

The second FF control unit 112 receives the target vehicle interval D* outputted from the target vehicle interval setting unit 102, and calculates and outputs a second feedforward vehicle velocity command $V_{FF\_dref}*$. The outputted second feedforward vehicle velocity command $V_{FF\_dref}*$ is inputted to the vehicle velocity command calculation unit 108A.

The vehicle velocity command calculation unit 108A calculates and outputs a vehicle velocity command V* with the following expression (24) by using the feedback vehicle velocity command $V_{FB}*$, the first feedforward vehicle velocity command $V_{FF\_init}*$, the second feedforward vehicle velocity command $V_{FF\_dref}*$, the delay distance compensation vehicle velocity command $V_{FF\_delay}*$, and the leading vehicle velocity follow-up command $V_{FF\_lead}*$ which have been inputted thereto. The outputted vehicle velocity command V* is inputted to the vehicle velocity control unit 12.

[Mathematical 24]

$$V^* = V_{FB}^* + V_{FF\_init}^* + V_{FF\_dref}^* + V_{FF\_delay}^* + V_{FF\_lead}^* \quad (24)$$

In FIG. 16, the same components as those in the vehicle-to-vehicle distance control device 300 in FIG. 14 are denoted by the same reference characters, and the same description will not be repeated.

Next, operations by the vehicle-to-vehicle distance control device 400 will be described.

Figure 17:
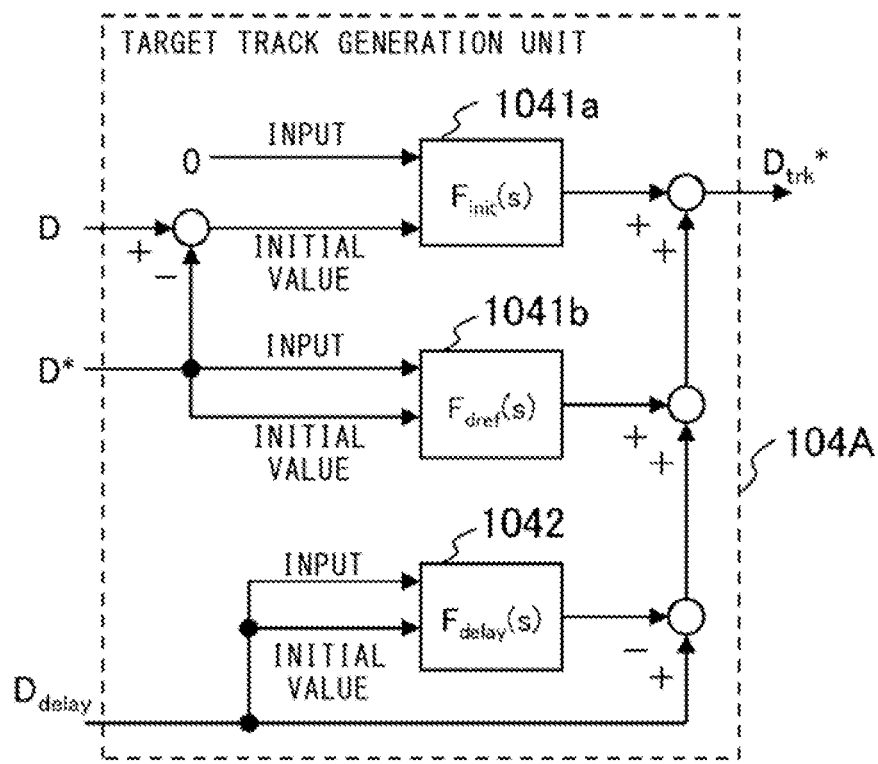
FIG. 17 is a control block diagram showing a configuration of a target track generation unit according to embodiment 4.

FIG. 17 is a control block diagram showing a configuration of the target track generation unit 104A. As compared to the target track generation unit 104 shown in FIG. 3, the filter $F_d(s)$ 1041 in FIG. 3 for which the initial value is the vehicle-to-vehicle distance initial value $D_0$ and the input is the target vehicle-to-vehicle distance D* is, in FIG. 17, divided into two which are: a filter $F_{init}(s)$ 1041a for which the initial value is a target vehicle interval deviation ($D_0$-D*) which is the deviation of the vehicle-to-vehicle distance initial value $D_0$ from the target vehicle-to-vehicle distance D*, and the input is 0; and a filter $F_{init}(s)$ 1041b for which the initial value and input are each the target vehicle-to-vehicle distance D*. The filter $F_{init}(s)$ 1041a is defined as, for example, a second-order transfer function of a frequency $\omega_{init}$ and an attenuation coefficient $\zeta_{init}$ corresponding to the target vehicle interval deviation, in the following expression (25).

[Mathematical 25]

$$F_{init}(s) = \frac{\omega_{init}^2}{s^2 + 2\zeta_{init}\omega_{init}s + \omega_{init}^2} \quad (25)$$

In the filter $F_{init}(s)$ 1041a, a process is executed until the target vehicle interval deviation ($D_0$-$D^*$) converges to 0. Since the input initial value is ($D_0$-$D^*$) and the subsequent input is 0, the target vehicle interval deviation is kept at 0 after the convergence. Therefore, if the frequency $\omega_{init}$ and the attenuation coefficient $\zeta_{init}$ which are response characteristics of the filter $F_{init}(s)$ are set at the time of start of control, the vehicle-to-vehicle distance control device 400 causes convergence from the vehicle-to-vehicle distance initial value $D_0$ to the target vehicle-to-vehicle distance $D^*$ according to the response characteristics which have been set.

The filter $F_{init}(s)$ 1041a operates in substantially the same manner as the filter $F_d(s)$ 1041 in FIG. 3 for which the initial value is the vehicle-to-vehicle distance initial value $D_0$ and the input is the target vehicle-to-vehicle distance $D^*$.

Similarly, the filter $F_{dref}(s)$ 1041b is defined as, for example, a second-order transfer function of a frequency $\omega_{dref}$ and an attenuation coefficient $\zeta_{dref}$ corresponding to the target vehicle-to-vehicle distance, as shown in the following expression (26).

[Mathematical 26]

$$F_{dref}(s) = \frac{\omega_{dref}^2}{s^2 + 2\zeta_{dref}\omega_{dref}s + \omega_{dref}^2} \quad (26)$$

The filter $F_{dref}(s)$ 1041b is a third filter that defines response characteristics to variation in the target vehicle-to-vehicle distance $D^*$ after start of control. Since the initial value and the input are each the target vehicle-to-vehicle distance $D^*$, if the target vehicle-to-vehicle distance $D^*$ does not vary, the output is constantly kept at $D^*$. Meanwhile, if the target vehicle-to-vehicle distance $D^*$ varies, follow-up to the target vehicle-to-vehicle distance $D^*$ is performed according to the second-order transfer function of the frequency $\omega_{dref}$ and the attenuation coefficient $\zeta_{dref}$ which are the response characteristics having been set.

As shown in FIG. 17, output results of the three filters 1041a, 1041b, and 1042 are calculated, and a target track $D_{trk}^*$ is outputted from the target track generation unit 104A.

Figure 18:
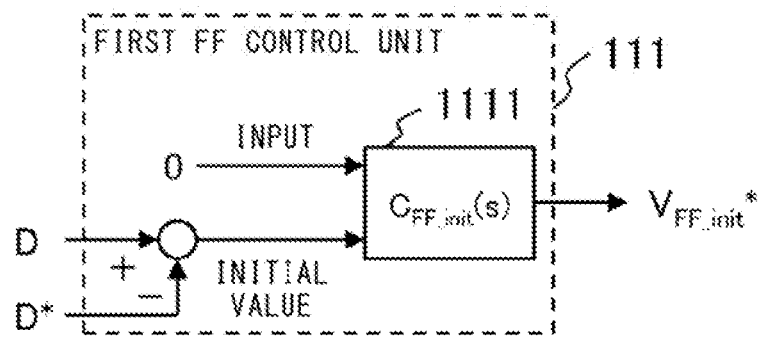

FIG. 18 is a control block diagram showing a configuration of the first FF control unit 111. The first FF control unit 111 includes a transfer function $C_{FF\_init}(s)$ 1111. The transfer function $C_{FF\_init}(s)$ expressed as in the following expression (27) by using the filter $F_{init}(s)$ of the target track generation unit 104A and the response characteristic $G_V(s)$ of the vehicle velocity control unit 12. Further, the transfer function $C_{FF\_init}(s)$ 1111 receives ($D_0$-$D^*$) as an initial value and then receives 0.

[Mathematical 27]

$$C_{FF\_init}(s) = -\frac{sF_{init}(s)}{G_V(s)} \quad (27)$$

Figure 19:
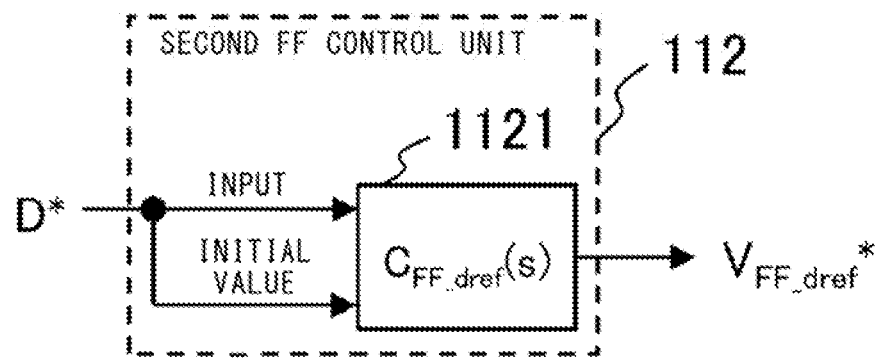
FIG. 19 is a control block diagram showing a configuration of a second FF control unit according to embodiment 4.

FIG. 19 is a control block diagram showing a configuration of the second FF control unit 112. The second FF control unit 112 includes a transfer function $C_{FF\_dref}(s)$ 1121. The transfer function $C_{FF\_dref}(s)$ is expressed as in the following expression (28) by using the filter $F_{dref}(s)$ of the target track generation unit 104A and the response characteristic $G_V(s)$ of the vehicle velocity control unit 12. Further, the transfer function $C_{FF\_dref}(s)$ 1121 receives the target vehicle-to-vehicle distance $D^*$ as both the initial value and the input.

[Mathematical 28]

$$C_{FF\_dref}(s) = -\frac{sF_{dref}(s)}{G_V(s)} \quad (28)$$

Figure 20:
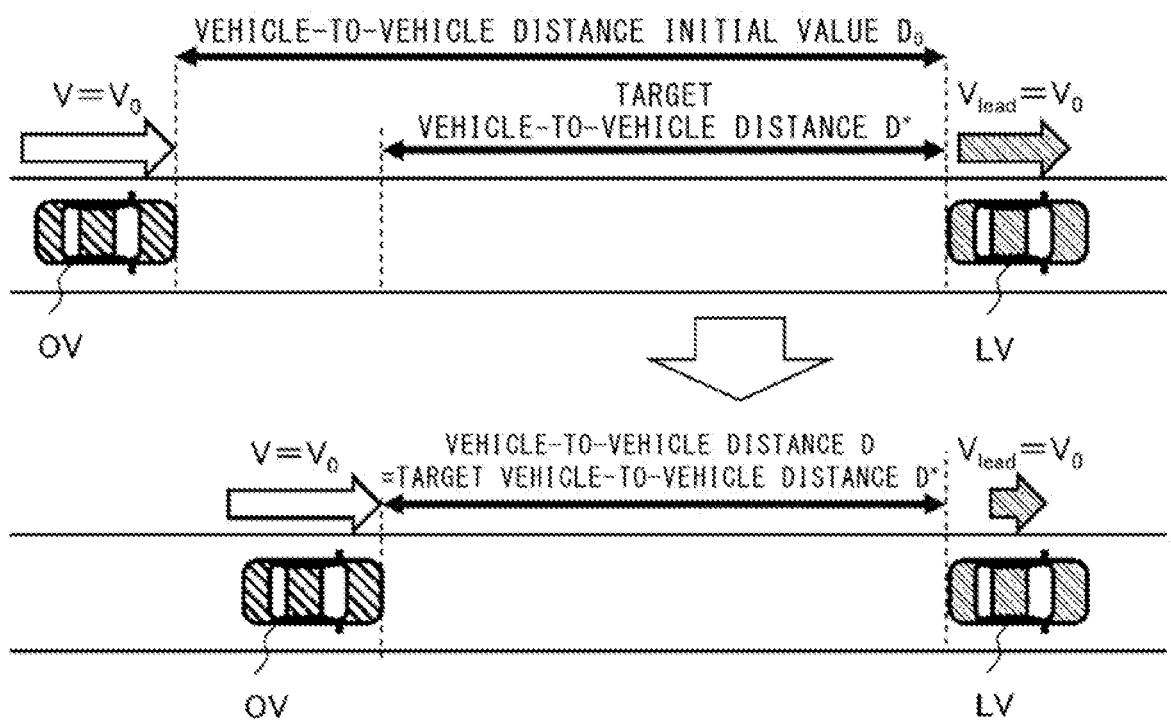
FIG. 20 is a diagram showing an example of a running scene in which control is to be performed by the vehicle-to-vehicle distance control device according to embodiment 4.
Figure 21:
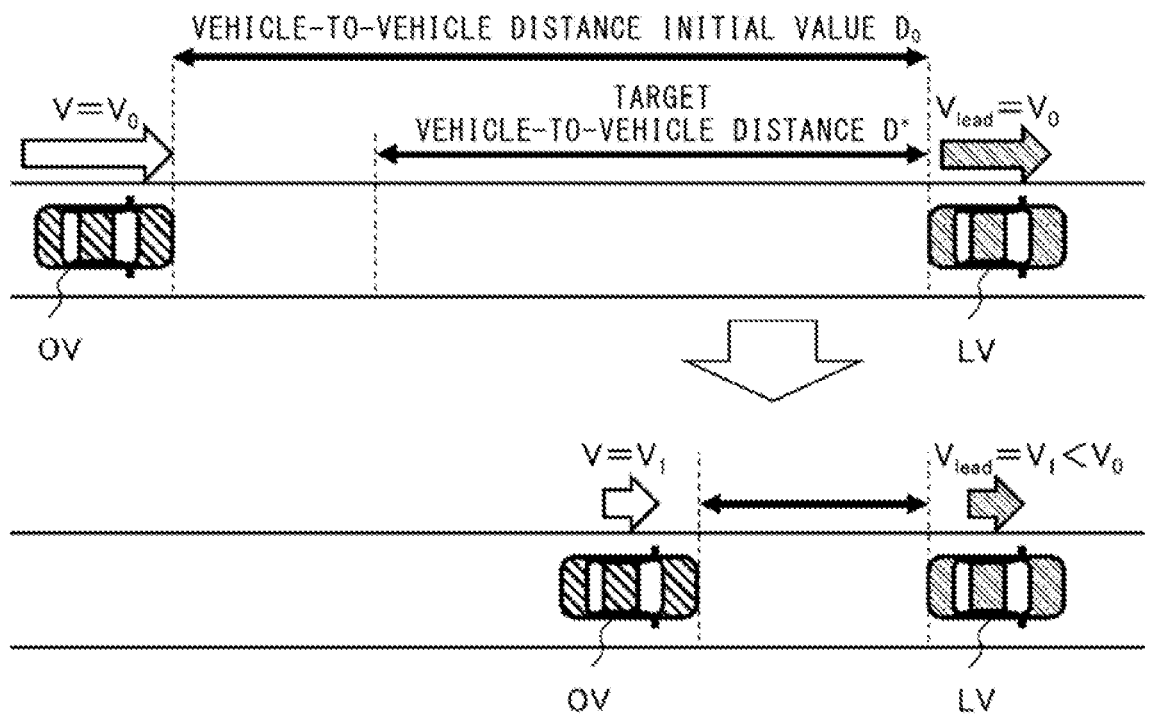
FIG. 21 is a diagram showing another example of the running scene in which control is to be performed by the vehicle-to-vehicle distance control device according to embodiment 4.

Next, control operations in a running scene by the vehicle-to-vehicle distance control device 400 according to the present, embodiment 4 will, be described on the basis of simulation results. FIGS. 20 and 21 are each a diagram showing an example of the running scene. FIG. 20 shows an example in the case where the own vehicle OV approaches the leading vehicle LV and the vehicle-to-vehicle distance D and the target vehicle-to-vehicle distance $D^*$ become equal to each other from a state where: the own vehicle OV and the leading vehicle LV have equal velocities ($V=V_{lead}=V_0$); and the initial value $D_0$ of the vehicle-to-vehicle distance D is larger than the target vehicle-to-vehicle distance $D^*$ ($D_0 > D^*$). In this case, the own vehicle OV needs to accelerate once to approach the leading vehicle LV such that the vehicle-to-vehicle distance D and the target vehicle-to-vehicle distance $D^*$ become equal to each other, and then decelerate again for being adjusted to the leading vehicle velocity $V_{lead}$.

FIG. 21 shows an example in the case where the leading vehicle LV decelerates and the vehicle-to-vehicle distance D and the target vehicle-to-vehicle distance $D^*$ after the deceleration of the leading vehicle become equal to each other from a state where: the own vehicle OV and the leading vehicle LV have equal velocities ($V=V_{lead}=V_0$); and the initial value $D_0$ of the vehicle-to-vehicle distance D is larger than the target vehicle-to-vehicle distance $D^*$ ($D_0 > D^*$). In this case, the own vehicle OV needs to perform: an operation of accelerating once to approach the leading vehicle LV such that the vehicle-to-vehicle distance D and the target vehicle-to-vehicle distance $D^*$ become equal to each other, and then decelerating, in the same manner as in FIG. 20; an operation of decelerating according to the deceleration of the leading vehicle LV; and an operation of approaching the lending vehicle up to a target vehicle-to-vehicle distance $D^*$ that decreases in association with the deceleration of the leading vehicle.

Figure 22:
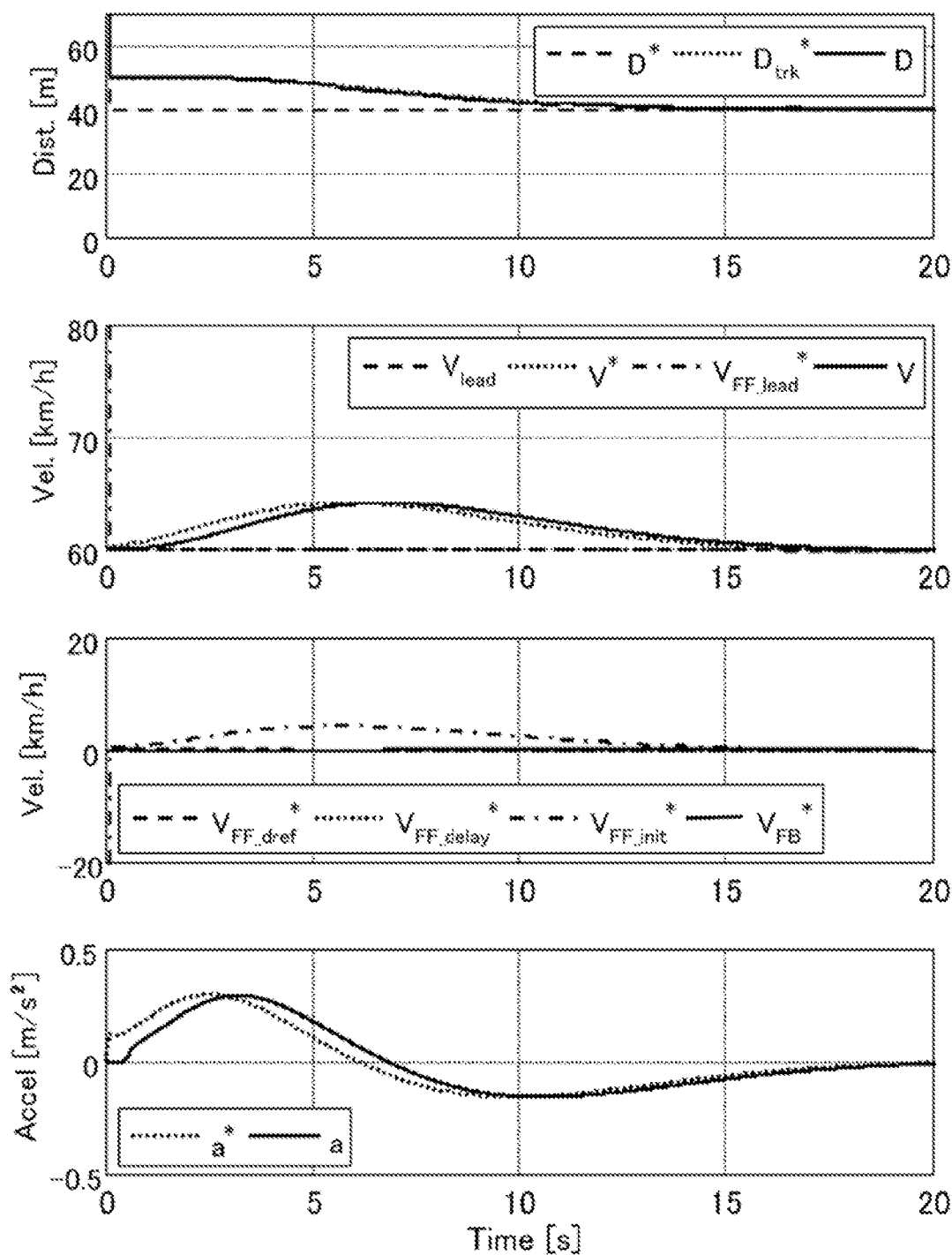
FIG. 22 is a diagram showing simulation results of control operations by the vehicle-to-vehicle distance control device according to embodiment 4.
Figure 23:
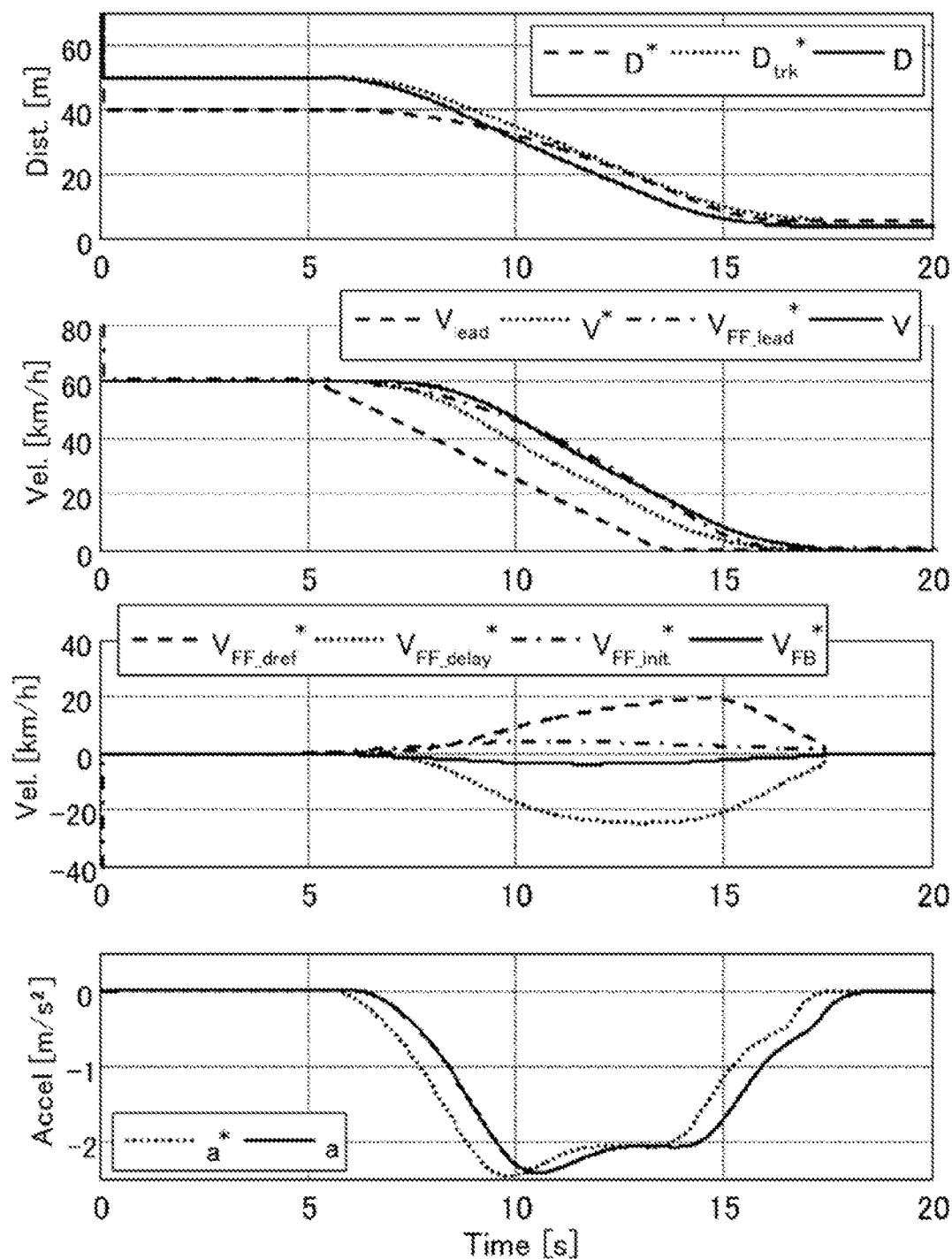
FIG. 23 is a diagram shewing simulation results of control operations by the vehicle-to-vehicle distance control device according to embodiment 4.

Simulation results in the present embodiment 4 corresponding to the running scene examples in FIG. 20 and FIG. 21 are respectively shown in FIG. 22 and FIG. 23. It is noted that displays of the simulation results in FIG. 22 and FIG. 23 are the same as those in embodiments 1 to 3.

In the initial state, i.e., at the time 0 [s] in FIG. 22, vehicle-to-vehicle distance initial value $D_0$=50 [m], target vehicle-to-vehicle distance $D^*$=40 [m], and own vehicle velocity V=leading vehicle velocity $V_{lead}$=60 [km/h] are satisfied. In addition, the leading vehicle velocity $V_{lead}$ is constant during the period shown in FIG. 22. Meanwhile, the own vehicle OV accelerates to shorten the vehicle-to-vehicle distance, and then decelerates again to the leading vehicle velocity $V_{lead}$. Regarding the vehicle-to-vehicle distance in the first row in FIG. 22, the target track $D_{trk}*$ is a temporal record from vehicle-to-vehicle distance initial value $D_0$=50 [m] until convergence to target vehicle-to-vehicle distance $D*$=40 [m], and is defined by the filter $F_{init}(s)$ of mathematical expression (25) in the target track generation unit 104A. Further, the vehicle velocity command $V*$ to adapt to the response characteristics of the filter is calculated with the above-described expression (24) by using the first feedforward vehicle velocity command $V_{FF\_init}*$ in the third row in FIG. 22. At this time, the feedback vehicle velocity command $V_{FB}*$ and the other feedforward commands in the third row in FIG. 22 are zero. By the present configuration, an operation of causing convergence of the vehicle-to-vehicle distance deviation ($D_0$-$D*$) at the time of start of control can be defined according to only the response characteristics of the filter $F_{init}(s)$.

Next, simulation results based on the running scene in FIG. 21 will be described with reference to FIG. 23. An initial state in FIG. 23 is the same as that in FIG. 22. In FIG. 23, the leading vehicle LV decelerates from leading vehicle velocity $V_{lead}$=60 [km/h] in the initial state to 0 [km/h]. At this time, the leading vehicle velocity follow-up command $V_{FF\_lead}*$ in the second row in FIG. 23 causes deceleration according to the response characteristic of the filter $F_{lead}(s)$ in association with the deceleration of the leading vehicle LV. Further, in the third row in FIG. 23, the first feedforward vehicle velocity command $V_{FF\_init}*$ causes acceleration for convergence of the vehicle-to-vehicle distance deviation ($D_0$-$D*$) at the time of start of control according to the response characteristics of the filter $F_{init}(s)$, the second feedforward vehicle velocity command $V_{FF\_dref}*$ causes, according to the response characteristics of the filter $F_{dref}(s)$, acceleration for follow-up to the target vehicle-to-vehicle distance $D*$ that is decreasing, and the delay distance compensation vehicle velocity command $V_{FF\_delay}*$ causes deceleration to compensate for a delay in the vehicle velocity control unit 12 according to the response characteristic of the filter $F_{delay}(s)$.

That is, the present configuration achieves individual designing for "the operation of causing follow-up to variation in the leading vehicle velocity", "the operation of causing convergence of the vehicle-to-vehicle distance deviation at the time of start of control", "the operation of causing follow-up to variation in the target vehicle-to-vehicle distance $D*$", and "the operation of compensating for a delay in control", whereby vehicle-to-vehicle distance control for follow-up to the target track $D_{trk}*$ can be realized.

As described above, according to the present embodiment 4: the two FF control units 111 and 112 are provided; two types of feedforward vehicle velocity commands corresponding to the target vehicle-to-vehicle distance $D*$ are used, the two types being the first feedforward vehicle velocity command $V_{FF\_init}*$ convergence of the vehicle-to-vehicle distance deviation ($D_0$-$D*$) at the time of start of control when the target vehicle-to-vehicle distance $D*$ varies and the second feedforward vehicle velocity command $V_{FF\_dref}*$ for follow-up to the target vehicle-to-vehicle distance $D*$ when the target vehicle-to-vehicle distance $D*$ varies; and the vehicle velocity command $V*$ is calculated by using these two types of feedforward vehicle velocity commands. Thus, it is possible to provide a vehicle-to-vehicle distance control device that, in addition to the advantageous effects of embodiments 1 to 3, achieve individual and accurate controls which are: follow-up to variation in the leading vehicle velocity convergence of the vehicle-to-vehicle distance deviation ($D_0$-$D*$) at the time of start of control; follow-up to variation in the target vehicle-to-vehicle distance $D*$; and compensation for a delay in control.

Although an example in which the leading vehicle LV decelerates has been described in FIG. 21 in the above-described embodiment 4, control can be performed in the same manner also in the case of acceleration, as a matter of course.

Further, although a configuration including the two FF control units 111 and 112 has been described in the present embodiment 4, the present configuration is applicable also to embodiment 1 and embodiment 2.

Figure 24:
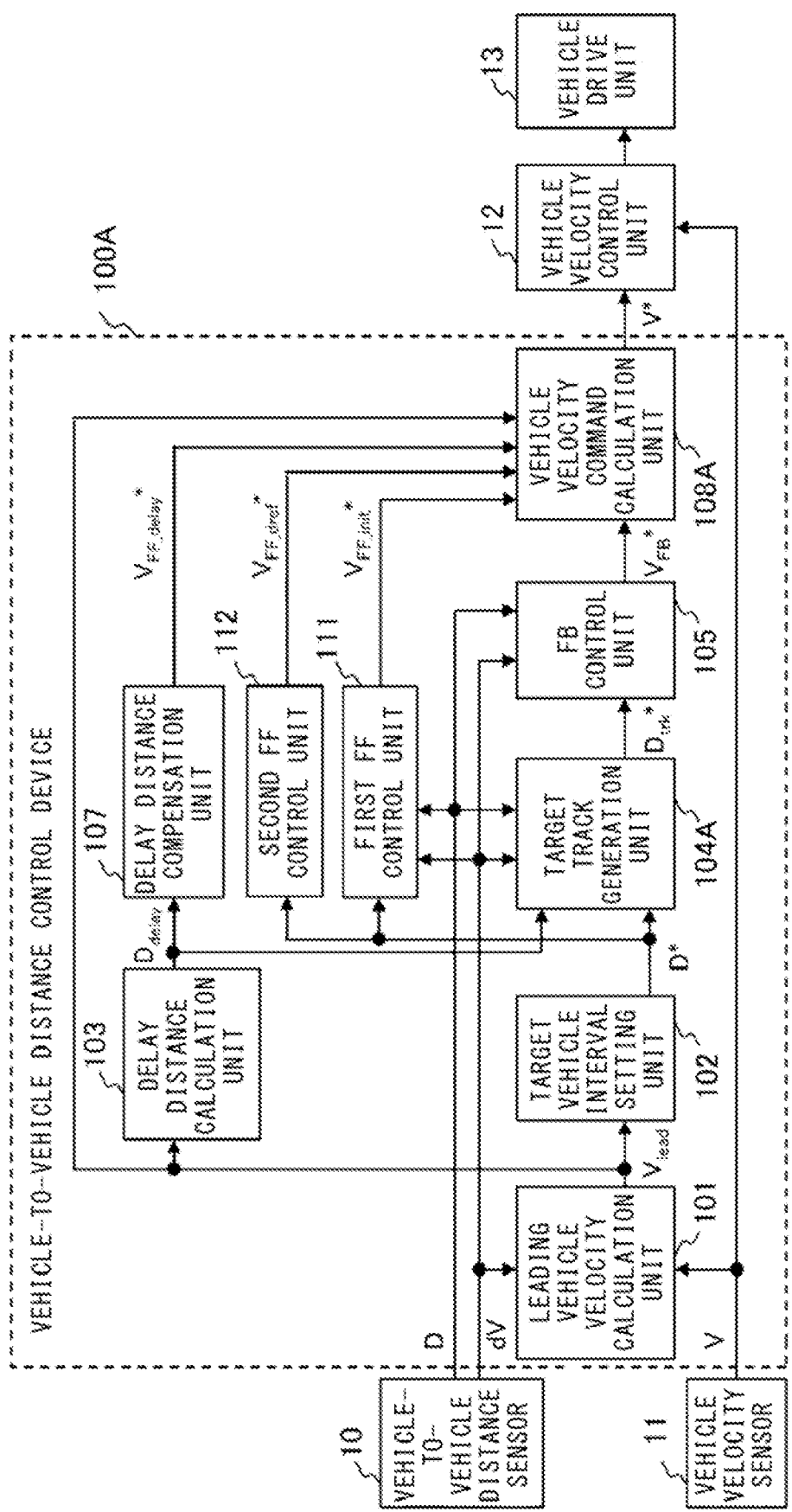
FIG. 24 is a function block diagram showing a configuration of another vehicle-to-vehicle distance control device according to embodiment 4.

FIG. 24 is a function block diagram showing a configuration of a vehicle-to-vehicle distance control device 100A obtained by replacing the FF control unit 106 of the vehicle-to-vehicle distance control device 100 according to embodiment 1 by the first FF control unit 111 and the second FF control unit 112. In the drawing, the target track generation unit 104A also includes the above-described two filters described with reference to the control block diagram in FIG. 17, which are: the filter $F_{init}(s)$ 1041a for which the initial value is the target vehicle interval deviation ($D_0$-$D*$) which is the deviation of the vehicle-to-vehicle distance initial value from the target vehicle-to-vehicle distance $D*$, and the input is 0; and the filter $F_{dref}*(s)$ 1041b for which the initial value and the input are each the target vehicle-to-vehicle distance $D*$. In addition, in the vehicle velocity command calculation unit 108A, the feedback vehicle velocity command $V_{FB}*$, the first feedforward vehicle velocity command $V_{FF\_init}*$, the second feedforward vehicle velocity command $V_{FF\_dref}*$, the delay distance compensation vehicle velocity command $V_{FF\_delay}*$, and the leading vehicle velocity $V_{lead}$ which have been inputted thereto are used, and, as the sum of these inputs, a vehicle velocity command $V*$ is calculated and outputted. The outputted vehicle velocity command $V*$ is inputted to the vehicle velocity control unit 12.

With the above configuration, in addition to the advantageous effects of embodiment 1, the two FF control units achieve individual designing for "the operation of causing convergence of the vehicle-to-vehicle distance deviation at the time of start of control" and "the operation of causing follow-up to variation in the target vehicle-to-vehicle distance $D*$", whereby an advantageous effect of realizing vehicle-to-vehicle distance control for follow-up to the target track $D_{trk}*$ can be obtained.

Figure 25:
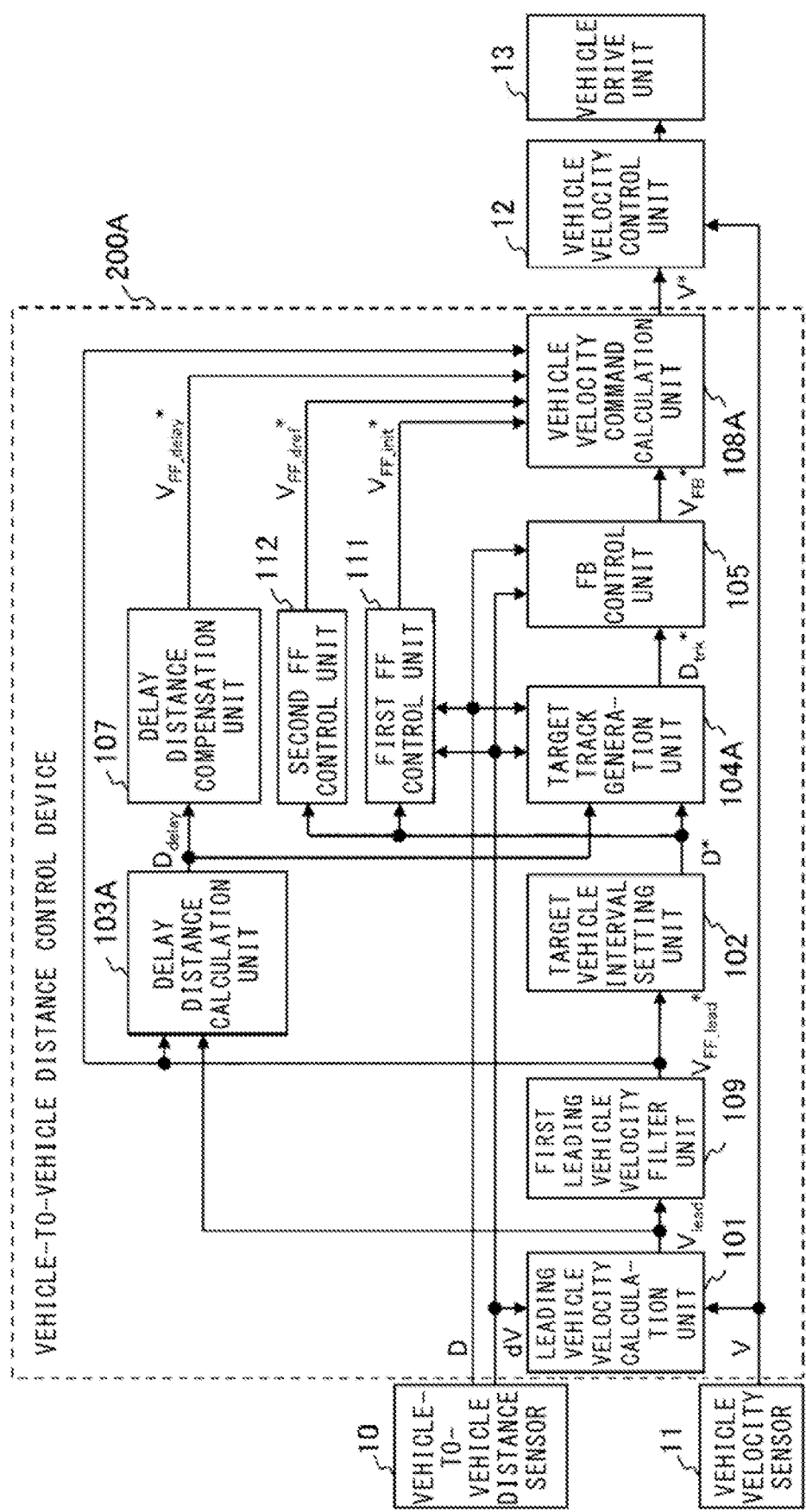
FIG. 25 is a function block diagram showing a configuration of another vehicle-to-vehicle distance control device according to embodiment 4.

FIG. 25 is a function block diagram showing a configuration of a vehicle-to-vehicle distance control device 200A obtained by replacing the FF control unit 106 of the vehicle-to-vehicle distance control device 200 according to embodiment 2 by the first FF control unit ill and the second FF control unit 112. Similar to FIG. 24, the target track generation unit 104A also has the configuration described with reference to the control block diagram in FIG. 17. In addition, in the vehicle velocity command calculation unit 108A, the feedback vehicle velocity command $V_{FB}*$, the first feedforward vehicle velocity command $V_{FF\_init}*$, the second feedforward vehicle velocity command $V_{FF\_dref}*$, the delay distance compensation vehicle velocity command $V_{FF\_delay}*$, and the leading vehicle velocity follow-up command $V_{FF\_lead}*$ which have been inputted thereto are used, and, as the sum of these inputs, a vehicle velocity command $V*$ is calculated and outputted. The outputted vehicle velocity command $V*$ is inputted to the vehicle velocity control unit 12.

With this configuration, in addition to the advantageous effects of embodiment 2, the two FF control units achieve individual designing for "the operation of causing convergence of the vehicle-to-vehicle distance deviation at the time of start of control" and "the operation of causing follow-up to variation in the target vehicle-to-vehicle distance $D^*$", whereby the advantageous effect of realizing vehicle-to-vehicle distance control for follow-up to the target track $D_{trk}^*$ can be obtained.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

DESCRIPTION OF THE REFERENCE CHARACTERS

- 10 vehicle-to-vehicle distance sensor
- 11 vehicle velocity sensor
- 12 vehicle velocity control unit
- 13 vehicle drive unit
- 20 processing circuit
- 21 processor
- 22 memory
- 100, 100A, 200, 200A, 300, 400 vehicle-to-vehicle distance control device
- 101 leading vehicle velocity calculation unit
- 102 target vehicle interval setting unit
- 103, 103A delay distance calculation unit
- 104, 104A target track generation unit
- 105 FB control unit
- 106 FF control unit
- 107 delay distance compensation unit
- 108, 108A vehicle velocity command calculation unit
- 109 first leading vehicle velocity filter unit
- 110 second leading vehicle velocity filter unit
- 111 first FF control unit
- 112 second FF control unit
- 1041, 1041a first filter
- 1041b third filter
- 1042 second filter

The invention claimed is:

1. A vehicle-to-vehicle distance control device that includes a vehicle velocity command calculator configured to calculate a vehicle velocity command for an own vehicle on the basis of a vehicle-to-vehicle distance between the own vehicle and a leading vehicle, a relative velocity to the leading vehicle, and a velocity of the own vehicle, the velocity of the own vehicle being controlled by a vehicle velocity controller according to the vehicle velocity command calculated by the vehicle velocity command calculator so that the vehicle-to-vehicle distance is controlled, the vehicle-to-vehicle distance control device comprising:

a leading vehicle velocity calculator configured to calculate a velocity of the leading vehicle on the basis of the velocity of the own vehicle and the relative velocity to the leading vehicle;

a target vehicle interval setter configured to set, on the basis of the velocity of the leading vehicle, a target vehicle-to-vehicle distance which is a target value according to which the vehicle-to-vehicle distance is controlled;

a delay distance calculator configured to calculate, on the basis of the velocity of the leading vehicle calculated by the leading vehicle velocity calculator, a delay distance which is a variation amount, of the vehicle-to-vehicle distance, that is based on a response delay in the vehicle velocity controller;

a target track generator including
a first filter configured to define a response characteristic from an initial value of the vehicle-to-vehicle distance until convergence to the target vehicle-to-vehicle distance, and
a second filter configured to define a response characteristic until the delay distance is compensated for and caused to converge to zero,
the target track generator being configured to generate a target track which is a vehicle-to-vehicle distance temporal record from the initial value of the vehicle-to-vehicle distance until arrival at the target vehicle-to-vehicle distance;

an FB controller configured to calculate a feedback vehicle velocity command by using a deviation between the vehicle-to-vehicle distance and the target track;

an FF controller configured to calculate a feedforward vehicle velocity command corresponding to the target vehicle-to-vehicle distance by using a transfer function of the response characteristic defined by the first filter of the target track generator and a transfer function of a response characteristic of the vehicle velocity controller; and a delay distance compensator configured to calculate a delay distance compensation vehicle velocity command corresponding to the delay distance by using a transfer function of the response characteristic defined by the second filter of the target track generator and the transfer function of the response characteristic of the vehicle velocity controller, wherein the vehicle velocity command calculator calculates the vehicle velocity command on the basis of the velocity of the leading vehicle, the feedback vehicle velocity command, the feedforward vehicle velocity command, and the delay distance compensation vehicle velocity command.

2. A vehicle-to-vehicle distance control device that includes a vehicle velocity command calculator configured to calculate a vehicle velocity command for an own vehicle on the basis of a vehicle-to-vehicle distance between the own vehicle and a leading vehicle, a relative velocity to the leading vehicle, and a velocity of the own vehicle, the velocity of the own vehicle being controlled by a vehicle velocity controller according to the vehicle velocity command calculated by the vehicle velocity command calculator so that the vehicle-to-vehicle distance is controlled, the vehicle-to-vehicle distance control device comprising:

a leading vehicle velocity calculator configured to calculate a velocity of the leading vehicle on the basis of the velocity of the own vehicle and the relative velocity to the leading vehicle;

a first leading vehicle velocity filter configured to perform a filtering process of delaying a response of the vehicle velocity command relative to the velocity of the leading vehicle, to calculate a leading vehicle velocity follow-up command;

a target vehicle interval setter configured to set, on the basis of the leading vehicle velocity follow-up command calculated by the first leading vehicle velocity filter, a target vehicle-to-vehicle distance which is a target value according to which the vehicle-to-vehicle distance is controlled;

a delay distance calculator configured to calculate, on the basis of the velocity of the leading vehicle calculated by the leading vehicle velocity calculator and the leading vehicle velocity follow-up command calculated by the first leading vehicle velocity filter, a delay distance which is a variation amount, of the vehicle-to-vehicle distance, that is based on response delays in the vehicle velocity controller and the first leading vehicle velocity filter unit;

a target track generator including a first filter configured to define a response characteristic from an initial value of the vehicle-to-vehicle distance until convergence to the target vehicle-to-vehicle distance, and a second filter configured to define a response characteristic until the delay distance is compensated for and caused to converge to zero, the target track generator being configured to generate a target track which is a vehicle-to-vehicle distance temporal record from the initial value of the vehicle-to-vehicle distance until arrival at the target vehicle-to-vehicle distance;

an FB controller configured to calculate a feedback vehicle velocity command by using a deviation between the vehicle-to-vehicle distance and the target track;

an FF controller configured to calculate a feedforward vehicle velocity command corresponding to the target vehicle-to-vehicle distance by using a transfer function of the response characteristic defined by the first filter of the target track generator and a transfer function of a response characteristic of the vehicle velocity controller; and a delay distance compensator configured to calculate a delay distance compensation vehicle velocity command corresponding to the delay distance by using a transfer function of the response characteristic defined by the second filter of the target track generator and the transfer function of the response characteristic of the vehicle velocity controller, wherein the vehicle velocity command calculator calculates the vehicle velocity command on the basis of the leading vehicle velocity follow-up command, the feedback vehicle velocity command, the feedforward vehicle velocity command, and the delay distance compensation vehicle velocity command.

3. A vehicle-to-vehicle distance control device that includes a vehicle velocity command calculator configured to calculate a vehicle velocity command for an own vehicle on the basis of a vehicle-to-vehicle distance between the own vehicle and a leading vehicle, a relative velocity to the leading vehicle, and a velocity of the own vehicle, the velocity of the own vehicle being controlled by a vehicle velocity controller according to the vehicle velocity command calculated by the vehicle velocity command calculator so that the vehicle-to-vehicle distance is controlled, the vehicle-to-vehicle distance control device comprising:

a leading vehicle velocity calculator configured to calculate a velocity of the leading vehicle on the basis of the velocity of the own vehicle and the relative velocity to the leading vehicle;

a second leading vehicle velocity filter configured to perform, on the velocity of the leading vehicle, a filtering process of eliminating noises included in the velocity of the own vehicle and the relative velocity to the leading vehicle, to calculate a second velocity of the leading vehicle;

a first leading vehicle velocity filter configured to perform a filtering process of delaying a response of the vehicle velocity command relative to the second velocity of the leading vehicle, to calculate a leading vehicle velocity follow-up command;

a target vehicle interval setter configured to set, on the basis of the leading vehicle velocity follow-up command calculated by the first leading vehicle velocity filter, a target vehicle-to-vehicle distance which is a target value according to which the vehicle-to-vehicle distance is controlled;

a delay distance calculator configured to calculate, on the basis of the second velocity of the leading vehicle calculated by the second leading vehicle velocity filter and the leading vehicle velocity follow-up command calculated by the first leading vehicle velocity filter, a delay distance which is a variation amount, of the vehicle-to-vehicle distance, that is based on response delays in the vehicle velocity controller and the first leading vehicle velocity filter;

a target track generator including a first filter configured to define a response characteristic from an initial value of the vehicle-to-vehicle distance until convergence to the target vehicle-to-vehicle distance, and a second filter configured to define a response characteristic until the delay distance is compensated for and caused to converge to zero, the target track generator being configured to generate a target track which is a vehicle-to-vehicle distance temporal record from the initial value of the vehicle-to-vehicle distance until arrival at the target vehicle-to-vehicle distance;

an FB controller configured to calculate a feedback vehicle velocity command by using a deviation between the vehicle-to-vehicle distance and the target track;

an FF controller configured to calculate a feedforward vehicle velocity command corresponding to the target vehicle-to-vehicle distance by using a transfer function of the response characteristic defined by the first filter of the target track generator and a transfer function of a response characteristic of the vehicle velocity control unit; and a delay distance compensator configured to calculate a delay distance compensation vehicle velocity command corresponding to the delay distance by using a transfer function of the response characteristic defined by the second filter of the target track generator and the transfer function of the response characteristic of the vehicle velocity controller, wherein the vehicle velocity command calculator calculates the vehicle velocity command on the basis of the leading vehicle velocity follow-up command, the feedback vehicle velocity command, the feedforward vehicle velocity command, and the delay distance compensation vehicle velocity command.

4. The vehicle-to-vehicle distance control device according to claim 1, wherein
the target track generator further includes a third filter configured to define a response characteristic to variation in the target vehicle-to-vehicle distance after start of control, and generates a target track which is a vehicle-to-vehicle distance temporal record from the initial value of the vehicle-to-vehicle distance until arrival at the target vehicle-to-vehicle distance,
the FF controller includes
a first FF controller configured to calculate a first feedforward vehicle velocity command corresponding to a difference between the initial value of the vehicle-to-vehicle distance and the target vehicle-to-vehicle distance by using the transfer function of the response characteristic defined by the first filter of the target track generator and the transfer function of the response characteristic of the vehicle velocity controller, and
a second FF controller configured to calculate a second feedforward vehicle velocity command corresponding to the target vehicle-to-vehicle distance by using a transfer function of the response characteristic defined by the third filter of the target track generator and the transfer function of the response characteristic of the vehicle velocity controller, and
the FF controller outputs, to the vehicle velocity command calculator, each of the first feedforward vehicle velocity command and the second feedforward vehicle velocity command which have been calculated.

5. The vehicle-to-vehicle distance control device according to claim 1, wherein
in the target track generator,
the first filter defines the response characteristic by using a second-order transfer function of a frequency and an attenuation coefficient corresponding to the target vehicle-to-vehicle distance so as to cause convergence from the initial value of the vehicle-to-vehicle distance to the target vehicle-to-vehicle distance, and
the second filter defines the response characteristic by using a second-order transfer function of a frequency and an attenuation coefficient corresponding to the delay distance so as to cause the delay distance to converge to zero.

6. The vehicle-to-vehicle distance control device according to claim 2, wherein
the target track generator further includes a third filter configured to define a response characteristic to variation in the target vehicle-to-vehicle distance after start of control, and generates a target track which is a vehicle-to-vehicle distance temporal record from the initial value of the vehicle-to-vehicle distance until arrival at the target vehicle-to-vehicle distance,
the FF controller includes
a first FF controller configured to calculate a first feedforward vehicle velocity command corresponding to a difference between the initial value of the vehicle-to-vehicle distance and the target vehicle-to-vehicle distance by using the transfer function of the response characteristic defined by the first filter of the target track generator and the transfer function of the response characteristic of the vehicle velocity controller, and
a second FF controller configured to calculate a second feedforward vehicle velocity command corresponding to the target vehicle-to-vehicle distance by using a transfer function of the response characteristic defined by the third filter of the target track generator and the transfer function of the response characteristic of the vehicle velocity controller, and
the FF controller outputs, to the vehicle velocity command calculator, each of the first feedforward vehicle velocity command and the second feedforward vehicle velocity command which have been calculated.

7. The vehicle-to-vehicle distance control device according to claim 3, wherein
the target track generator further includes a third filter configured to define a response characteristic to variation in the target vehicle-to-vehicle distance after start of control, and generates a target track which is a vehicle-to-vehicle distance temporal record from the initial value of the vehicle-to-vehicle distance until arrival at the target vehicle-to-vehicle distance,
the FF controller includes
a first FF controller configured to calculate a first feedforward vehicle velocity command corresponding to a difference between the initial value of the vehicle-to-vehicle distance and the target vehicle-to-vehicle distance by using the transfer function of the response characteristic defined by the first filter of the target track generator and the transfer function of the response characteristic of the vehicle velocity controller, and
a second FF controller configured to calculate a second feedforward vehicle velocity command corresponding to the target vehicle-to-vehicle distance by using a transfer function of the response characteristic defined by the third filter of the target track generator and the transfer function of the response characteristic of the vehicle velocity controller, and
the FF controller outputs, to the vehicle velocity command calculator, each of the first feedforward vehicle velocity command and the second feedforward vehicle velocity command which have been calculated.

8. The vehicle-to-vehicle distance control device according to claim 2, wherein
in the target track generator,
the first filter defines the response characteristic by using a second-order transfer function of a frequency and an attenuation coefficient corresponding to the target vehicle-to-vehicle distance so as to cause convergence from the initial value of the vehicle-to-vehicle distance to the target vehicle-to-vehicle distance, and
the second filter defines the response characteristic by using a second-order transfer function of a frequency and an attenuation coefficient corresponding to the delay distance so as to cause the delay distance to converge to zero.

9. The vehicle-to-vehicle distance control device according to claim 3, wherein
in the target track generator,
the first filter defines the response characteristic by using a second-order transfer function of a frequency and an attenuation coefficient corresponding to the target vehicle-to-vehicle distance so as to cause convergence from the initial value of the vehicle-to-vehicle distance to the target vehicle-to-vehicle distance, and
the second filter defines the response characteristic by using a second-order transfer function of a frequency and an attenuation coefficient corresponding to the delay distance so as to cause the delay distance to converge to zero.

10. The vehicle-to-vehicle distance control device according to claim 4, wherein in the target track generator, the first filter defines the response characteristic by using a second-order transfer function of a frequency and an attenuation coefficient corresponding to the target vehicle-to-vehicle distance so as to cause convergence from the initial value of the vehicle-to-vehicle distance to the target vehicle-to-vehicle distance, and the second filter defines the response characteristic by using a second-order transfer function of a frequency and an attenuation coefficient corresponding to the delay distance so as to cause the delay distance to converge to zero.

11. The vehicle-to-vehicle distance control device according to claim 6, wherein in the target track generator, the first filter defines the response characteristic by using a second-order transfer function of a frequency and an attenuation coefficient corresponding to the target vehicle-to-vehicle distance so as to cause convergence from the initial value of the vehicle-to-vehicle distance to the target vehicle-to-vehicle distance, and the second filter defines the response characteristic by using a second-order transfer function of a frequency and an attenuation coefficient corresponding to the delay distance so as to cause the delay distance to converge to zero.

12. The vehicle-to-vehicle distance control device according to claim 7, wherein in the target track generator, the first filter defines the response characteristic by using a second-order transfer function of a frequency and an attenuation coefficient corresponding to the target vehicle-to-vehicle distance so as to cause convergence from the initial value of the vehicle-to-vehicle distance to the target vehicle-to-vehicle distance, and the second filter defines the response characteristic by using a second-order transfer function of a frequency and an attenuation coefficient corresponding to the delay distance so as to cause the delay distance to converge to zero.

\* \* \* \* \*